(12) United States Patent
Khalid et al.

(10) Patent No.: US 11,363,466 B2
(45) Date of Patent: Jun. 14, 2022

(54) METHODS AND APPARATUS FOR ANTENNA OPTIMIZATION IN A QUASI-LICENSED WIRELESS SYSTEM

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 16/749,539

(22) Filed: Jan. 22, 2020

(65) Prior Publication Data

US 2021/0227396 A1    Jul. 22, 2021

(51) Int. Cl.
*H04W 16/14* (2009.01)
*H04B 7/06* (2006.01)
*H04W 16/28* (2009.01)

(52) U.S. Cl.
CPC .......... *H04W 16/14* (2013.01); *H04B 7/0608* (2013.01); *H04W 16/28* (2013.01)

(58) Field of Classification Search
CPC ..... H04W 16/14; H04W 16/28; H04W 72/04; H04W 72/12; H04W 76/00; H04B 7/0608;
(Continued)

(56) References Cited

U.S. PATENT DOCUMENTS 5,991,308 A   11/1999  Fuhrmann et al.
5,995,499 A   11/1999  Hottinen et al.
(Continued)

FOREIGN PATENT DOCUMENTS

WO   WO-2017130494 A1   8/2017
WO   WO-2019140461 A1   7/2019
(Continued)

OTHER PUBLICATIONS

Souryal, Michael R., and Thao T. Nguyen. "Effect of Federal Incumbent Activity on CBRS Commercial Service." 2019 IEEE International Symposium on Dynamic Spectrum Access Networks (DySPAN). IEEE, 2019. (Year: 2019).*

(Continued)

*Primary Examiner* — Sharad Rampuria

(74) *Attorney, Agent, or Firm* — Gazdzinski & Associates, PC

(57) ABSTRACT

Methods and apparatus for optimizing antenna beam and performance within a wireless system. In one embodiment, the methods and apparatus utilize so-called "quasi-licensed" CBRS (Citizens Broadband Radio Service) wireless spectrum in conjunction with a controller that dynamically adjusts antenna direction, orientation and receive/transmit beam for receiving/transmitting the information at an installed fixed wireless apparatus (FWA) at user or subscriber premises. In one variant, the FWA includes controller logic that tracks Radio Frequency (RF) propagation parameters and optimizes antenna azimuth and tilt to maximize the antenna gain towards a serving base station. As such, service calls by operator personnel to optimize antenna performance are not required, thereby reducing network operating expenses. Moreover, increased customer density at a pre-scribed service level is achieved through more precise coordination and mitigation of interference between nearby FWA devices and their serving base stations.

26 Claims, 24 Drawing Sheets

(58) Field of Classification Search
CPC ............... H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 6,154,648 A | 11/2000 | Comer | |
| 6,356,560 B1 | 3/2002 | Venters et al. | |
| 6,771,953 B1 | 8/2004 | Chow et al. | |
| 7,266,726 B1 | 9/2007 | Ladd et al. | |
| 7,592,912 B2 | 9/2009 | Hasek et al. | |
| 7,602,820 B2 | 10/2009 | Helms et al. | |
| 8,095,610 B2 | 1/2012 | Gould et al. | |
| 8,170,065 B2 | 5/2012 | Hasek et al. | |
| 8,302,111 B2 | 10/2012 | Ladd et al. | |
| 8,718,100 B2 | 5/2014 | Markley et al. | |
| 8,799,723 B2 | 8/2014 | Ladd et al. | |
| 8,997,136 B2 | 3/2015 | Brooks et al. | |
| 9,185,341 B2 | 11/2015 | Hardin | |
| 9,213,538 B1 | 12/2015 | Ladd et al. | |
| 9,258,809 B2 | 2/2016 | Liao et al. | |
| 9,264,751 B2 | 2/2016 | Sarosi et al. | |
| 9,300,445 B2 | 3/2016 | Hardin | |
| 9,386,496 B2 | 7/2016 | Gupta et al. | |
| 9,414,111 B2 | 8/2016 | Hasek et al. | |
| 9,472,091 B2 | 10/2016 | Stern et al. | |
| 9,479,404 B2 | 10/2016 | Ladd et al. | |
| 9,526,056 B2 | 12/2016 | Tomici et al. | |
| 9,699,663 B1 | 7/2017 | Jovancevic | |
| 9,769,692 B2 | 9/2017 | Freda et al. | |
| 9,807,778 B2 | 10/2017 | Ma et al. | |
| 9,813,148 B2 | 11/2017 | Syed et al. | |
| 10,098,568 B2 | 10/2018 | Gazdzinski | |
| 10,135,730 B2 | 11/2018 | Chou | |
| 10,164,858 B2 | 12/2018 | Gunasekara et al. | |
| 10,269,229 B2 | 4/2019 | Stern et al. | |
| 10,340,976 B2 | 7/2019 | Kakinada et al. | |
| 10,405,192 B2 | 9/2019 | Kakinada et al. | |
| 10,484,876 B2 | 11/2019 | Shah et al. | |
| 10,492,204 B2 | 11/2019 | Kakinada et al. | |
| 10,506,456 B2 | 12/2019 | Lou et al. | |
| 10,531,309 B1 * | 1/2020 | Li | H04W 24/10 |
| 10,536,859 B2 | 1/2020 | Gunasekara et al. | |
| 10,680,883 B2 | 6/2020 | Hall et al. | |
| 10,805,562 B2 | 10/2020 | Nakamura et al. | |
| 10,966,073 B2 | 3/2021 | Petersen | |
| 10,979,768 B2 | 4/2021 | Sarosi et al. | |
| 10,991,227 B2 | 4/2021 | Stern et al. | |
| 11,026,205 B2 | 6/2021 | Hmimy et al. | |
| 2002/0122040 A1 | 9/2002 | Noyle | |
| 2002/0126748 A1 | 9/2002 | Rafie et al. | |
| 2003/0158906 A1 | 8/2003 | Hayes | |
| 2004/0001021 A1 | 1/2004 | Choo et al. | |
| 2004/0187150 A1 | 9/2004 | Gonder et al. | |
| 2004/0230754 A1 | 11/2004 | Gumm et al. | |
| 2006/0188004 A1 | 8/2006 | Kizu et al. | |
| 2007/0022459 A1 | 1/2007 | Gaebel et al. | |
| 2007/0094691 A1 | 4/2007 | Gazdzinski | |
| 2008/0010506 A1 | 1/2008 | Tabei et al. | |
| 2008/0097913 A1 | 4/2008 | Dicks et al. | |
| 2008/0126540 A1 | 5/2008 | Zeng et al. | |
| 2008/0220786 A1 | 9/2008 | Beacham | |
| 2008/0220788 A1 | 9/2008 | Stanwood et al. | |
| 2008/0235746 A1 | 9/2008 | Peters et al. | |
| 2009/0028182 A1 | 1/2009 | Brooks et al. | |
| 2009/0034443 A1 | 2/2009 | Walker et al. | |
| 2009/0129273 A1 | 5/2009 | Zou | |
| 2009/0323516 A1 | 12/2009 | Bhagwan et al. | |
| 2010/0094956 A1 | 4/2010 | Zuckerman et al. | |
| 2010/0262722 A1 | 10/2010 | Vauthier et al. | |
| 2010/0309806 A1 | 12/2010 | Wu et al. | |
| 2011/0014924 A1 | 1/2011 | Hwang et al. | |
| 2011/0292970 A1 | 12/2011 | Lansford et al. | |
| 2013/0007413 A1 | 1/2013 | Thomson et al. | |
| 2013/0122903 A1 | 5/2013 | Farnsworth et al. | |
| 2013/0281092 A1 | 10/2013 | Gassend | |
| 2013/0288675 A1 | 10/2013 | Gassend | |
| 2013/0315124 A1 | 11/2013 | Rapaport et al. | |
| 2013/0336175 A1 | 12/2013 | Um et al. | |
| 2014/0035182 A1 | 2/2014 | Boyer et al. | |
| 2014/0106672 A1 | 4/2014 | Jeon et al. | |
| 2014/0194068 A1 | 7/2014 | Coppage et al. | |
| 2014/0215457 A1 | 7/2014 | Gava et al. | |
| 2014/0241187 A1 | 8/2014 | Barkay et al. | |
| 2014/0269526 A1 | 9/2014 | Mitola, III | |
| 2014/0308986 A1 | 10/2014 | Yang et al. | |
| 2015/0055623 A1 | 2/2015 | Li et al. | |
| 2015/0058861 A1 | 2/2015 | Zheng et al. | |
| 2015/0071239 A1 | 3/2015 | Zhang et al. | |
| 2015/0156095 A1 | 6/2015 | Lu | |
| 2015/0208262 A1 | 7/2015 | Siomina | |
| 2015/0280847 A1 | 10/2015 | Somasundaram et al. | |
| 2015/0334664 A1 | 11/2015 | Sawai et al. | |
| 2016/0007147 A1 | 1/2016 | Zhang et al. | |
| 2016/0073259 A1 | 3/2016 | Lee et al. | |
| 2016/0128001 A1 | 5/2016 | Tsuda | |
| 2016/0165066 A1 | 6/2016 | Yang et al. | |
| 2016/0212031 A1 | 7/2016 | Jain et al. | |
| 2016/0234746 A1 | 8/2016 | Gopal et al. | |
| 2016/0330743 A1 | 11/2016 | Das et al. | |
| 2016/0381600 A1 | 12/2016 | Aksu | |
| 2017/0026203 A1 | 1/2017 | Thomas et al. | |
| 2017/0104644 A1 | 4/2017 | Ladd et al. | |
| 2017/0155703 A1 | 6/2017 | Hao et al. | |
| 2017/0164326 A1 | 6/2017 | Worrall | |
| 2017/0188241 A1 | 6/2017 | Mueck et al. | |
| 2017/0208540 A1 | 7/2017 | Egner et al. | |
| 2017/0257750 A1 | 9/2017 | Gunasekara et al. | |
| 2017/0295578 A1 | 10/2017 | Khoshnevisan et al. | |
| 2017/0303138 A1 | 10/2017 | Barmettler et al. | |
| 2017/0311290 A1 | 10/2017 | Adjakple et al. | |
| 2017/0318472 A1 | 11/2017 | Yu et al. | |
| 2017/0359731 A1 | 12/2017 | Soldati et al. | |
| 2018/0007587 A1 | 1/2018 | Feldman et al. | |
| 2018/0063736 A1 | 3/2018 | Sadeghi et al. | |
| 2018/0063758 A1 | 3/2018 | Velu | |
| 2018/0115903 A1 | 4/2018 | Badic et al. | |
| 2018/0124613 A1 | 5/2018 | Kang et al. | |
| 2018/0132112 A1 | 5/2018 | Khoshnevisan et al. | |
| 2018/0146058 A1 | 5/2018 | Somayazulu et al. | |
| 2018/0146408 A1 | 5/2018 | Meylan et al. | |
| 2018/0167948 A1 | 6/2018 | Egner et al. | |
| 2018/0199214 A1 | 7/2018 | Shen | |
| 2018/0234403 A1 | 8/2018 | Casella et al. | |
| 2018/0235007 A1 | 8/2018 | Gou et al. | |
| 2018/0242184 A1 | 8/2018 | Yerramalli et al. | |
| 2018/0255576 A1 | 9/2018 | Bhorkar et al. | |
| 2018/0279212 A1 | 9/2018 | Malik et al. | |
| 2018/0316563 A1 | 11/2018 | Kumar et al. | |
| 2018/0323938 A1 | 11/2018 | Takeda et al. | |
| 2018/0352386 A1 | 12/2018 | Gunasekara et al. | |
| 2019/0021012 A1 | 1/2019 | Beck et al. | |
| 2019/0028182 A1 | 1/2019 | Smyth et al. | |
| 2019/0044614 A1 | 2/2019 | Khoshnevisan et al. | |
| 2019/0081690 A1 | 3/2019 | Mueck et al. | |
| 2019/0082447 A1 | 3/2019 | Harsha et al. | |
| 2019/0098510 A1 | 3/2019 | Guo et al. | |
| 2019/0098632 A1 | 3/2019 | Martin et al. | |
| 2019/0104551 A1 | 4/2019 | Deenoo et al. | |
| 2019/0150182 A1 | 5/2019 | Koorapaty et al. | |
| 2019/0182895 A1 | 6/2019 | Di Girolamo et al. | |
| 2019/0222266 A1 | 7/2019 | Cui et al. | |
| 2019/0230613 A1 | 7/2019 | Kim et al. | |
| 2019/0239190 A1 | 8/2019 | Patel et al. | |
| 2019/0289470 A1 | 9/2019 | Vaidya et al. | |
| 2019/0319814 A1 | 10/2019 | Das | |
| 2019/0319858 A1 | 10/2019 | Das et al. | |
| 2019/0320250 A1 | 10/2019 | Hoole et al. | |
| 2019/0320322 A1 | 10/2019 | Jayawardene et al. | |
| 2019/0320490 A1 | 10/2019 | Liu et al. | |
| 2019/0320494 A1 | 10/2019 | Jayawardene et al. | |
| 2019/0349848 A1 | 11/2019 | Bali | |
| 2019/0364565 A1 | 11/2019 | Hmimy et al. | |
| 2019/0373615 A1 * | 12/2019 | Cimpu | H04L 27/0006 |

(56) References Cited

U.S. PATENT DOCUMENTS

| | | | |
|---|---|---|---|
| 2019/0393926 | A1 | 12/2019 | Kakinada et al. |
| 2019/0394790 | A1 | 12/2019 | Damnjanovic et al. |
| 2020/0021689 | A1 | 1/2020 | Sultana et al. |
| 2020/0025629 | A1 | 1/2020 | Zinger et al. |
| 2020/0053545 | A1 | 2/2020 | Wong et al. |
| 2020/0059795 | A1 | 2/2020 | Kakinada et al. |
| 2020/0084759 | A1 | 3/2020 | Liu et al. |
| 2020/0178237 | A1 | 6/2020 | Kakinada et al. |
| 2020/0221392 | A1 | 7/2020 | Xue et al. |
| 2020/0228993 | A1 | 7/2020 | Gunasekara |
| 2020/0252933 | A1 | 8/2020 | Hmimy et al. |
| 2020/0275457 | A1 | 8/2020 | Hmimy |
| 2020/0344515 | A1 | 10/2020 | Wong et al. |
| 2020/0412565 | A1 | 12/2020 | Sanders |
| 2021/0014693 | A1 | 1/2021 | Syed et al. |
| 2021/0026711 | A1 | 1/2021 | Ovadia et al. |
| 2021/0051653 | A1 | 2/2021 | Park et al. |
| 2021/0076424 | A1 | 3/2021 | Mukherjee et al. |
| 2021/0084117 | A1 | 3/2021 | Ovadia et al. |
| 2021/0105633 | A1 | 4/2021 | Vaidya et al. |
| 2021/0120315 | A1 | 4/2021 | Makinen et al. |
| 2021/0126662 | A1 | 4/2021 | Solichien |
| 2021/0127423 | A1 | 4/2021 | Park et al. |
| 2021/0136838 | A1 | 5/2021 | Khalid et al. |
| 2021/0204322 | A1 | 7/2021 | Lou et al. |
| 2021/0219143 | A1 | 7/2021 | Khalid et al. |
| 2021/0219303 | A1 | 7/2021 | Khalid et al. |
| 2021/0258868 | A1 | 8/2021 | Wong et al. |
| 2021/0266914 | A1 | 8/2021 | Yoo et al. |
| 2021/0274333 | A1 | 8/2021 | Petersen |
| 2021/0274499 | A1 | 9/2021 | Hmimy et al. |
| 2021/0297979 | A1 | 9/2021 | Hmimy et al. |
| 2022/0007200 | A1 | 1/2022 | Sevindik |
| 2022/0007374 | A1 | 1/2022 | Sevindik |

FOREIGN PATENT DOCUMENTS

| | | | |
|---|---|---|---|
| WO | WO-2020160403 | A1 | 8/2020 |
| WO | WO-2021050957 | A1 | 3/2021 |
| WO | WO-2021067810 | A1 | 4/2021 |
| WO | WO-2021086986 | A1 | 5/2021 |

OTHER PUBLICATIONS

Palola, Marko, et al. "Field trial of the 3.5 GHz citizens broadband radio service governed by a spectrum access system (SAS)." 2017 IEEE International Symposium on Dynamic Spectrum Access Networks (DySPAN). IEEE, 2017. (Year: 2017).*

Deering S., et al., "Internet Protocol, Version 6 (IPv6) Specification", Internet Engineering Task Force (IETF), Dec. 1998, 39 pages.

"Internet Protocol, DARPA Internet Program, Protocol Specification", IETF RFC 791, Sep. 1981.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1, Jan. 3, 2018.

3Gpp, "Technical Specification—3rd Generation Partnership Project, Technical Specification Group Services and System Aspects, Telecommunication Management, Charging management, Proximity-based services (ProSe) charging (Release 14)," TS 32.277, V14.0.0, Sep. 2016, 91 pages.

3GPP TR 36.746 V15.0.0 (Sep. 2017), "3rd Generation Partnership Project; Technical Specification Group Radio Access Network; Study on Further Enhancements to LTE Device to Device (D2D), User Equipment (UE) to Network Relays for Internet of Things (IoT) and Wearables; (Release 15)", 56 pages.

3GPP., TS 23.303 V12.0.0 (Feb. 2014), "3rd Generation Partnership Project; Technical Specification Group Services and System Aspects; Proximity-based Services (ProSe), Stage 2 (Release 12)", 53 pages.

3GPP TS 23.501 v.15.4.0 (Dec. 2018) 3rd Generation Partnership Project; Technical Specification Group Services and System Aspects; System Architecture for the 5G System; Stage 2; Release 15, 236 pages.

3GPP TS 38.473 V15.A.A (Apr. 2018) 3rd Generation Partnership Project; Technical Specification Group Radio Access Network; NG-Ran; F1 application protocol (F1AP) (Release 15), 106 pages.

3GPP TS 38.889 3rd Generation Partnership Project; Technical Specification Group Radio Access Network; Study on NR-based Access to Unlicensed Spectrum; Release 16, (Nov. 2018), 120 pages.

3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.

Article 5 of the Radio Regulations (edition 2001), Introduction to International Radio Regulations, 161 pages.

IEEE 802.11 standard, 1997, www.ieeexplore.ieee.org/document/654779.

IEEE Std. 802.11 or related standards including 802.11a/b/g/n/s/v/ac/ad/ax/ay/ba/be or 802.11-2012/2013, 802.11-2016.

Nokia 5G New Radio (NR): Physical Layer Overview and Performance, IEEE Communication Theory Workshop, 2018 by A. Ghosh, May 15, 2018, 38 pages.

"Wi-Fi Peer-to-Peer (P2P) Specification", Version 1.5, 2014, Wi-Fi Alliance, 90 pages.

* cited by examiner

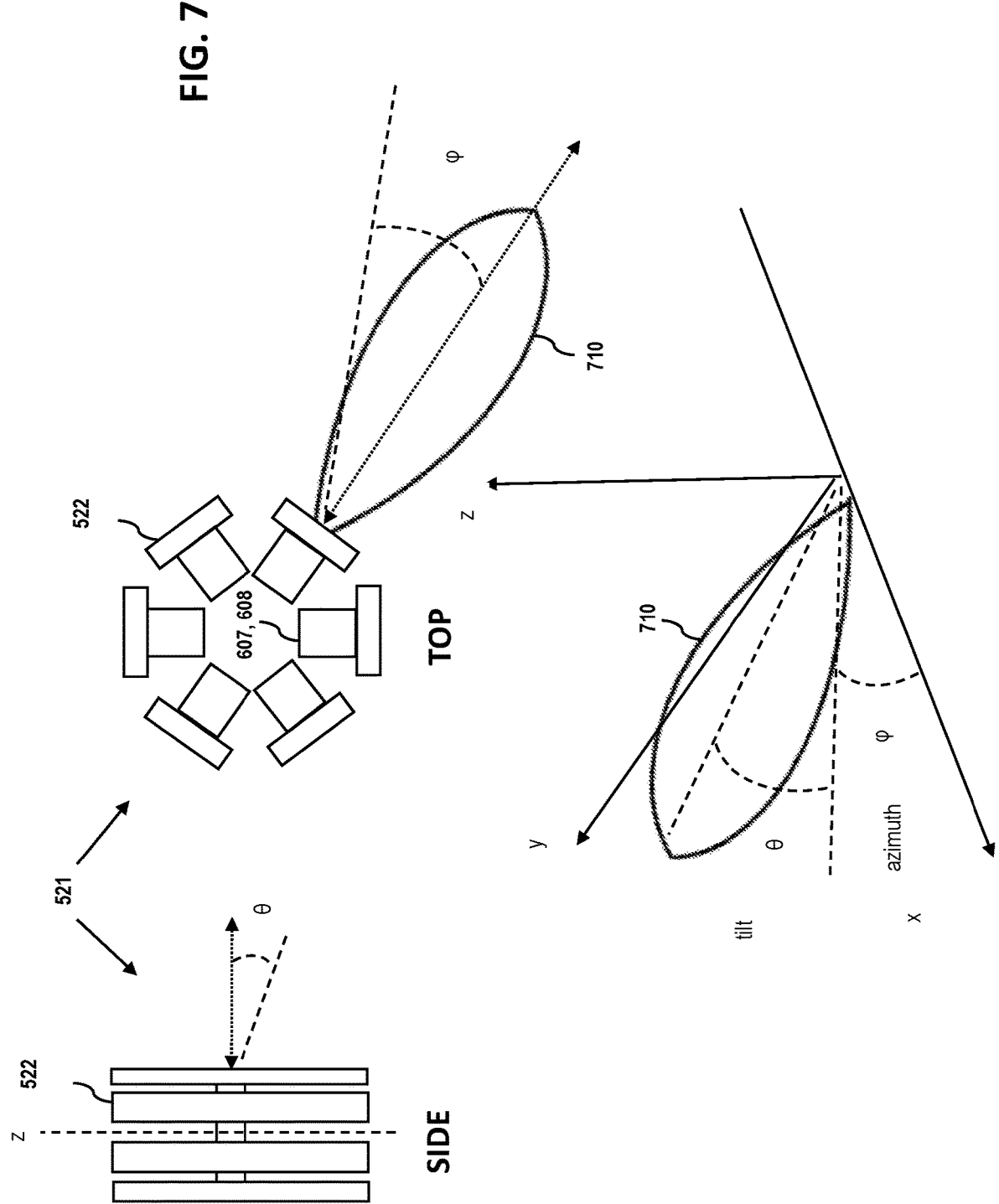

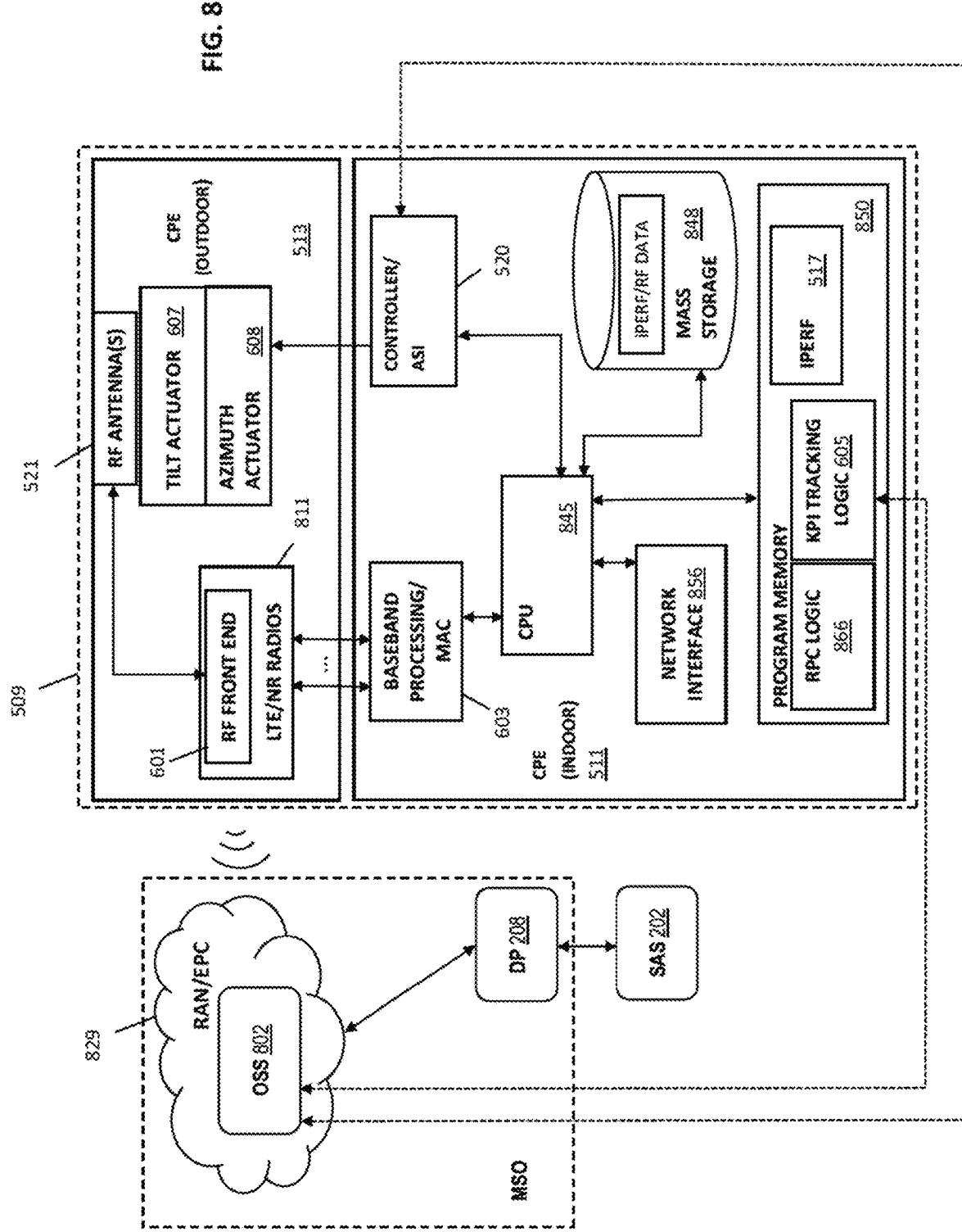

METHODS AND APPARATUS FOR ANTENNA OPTIMIZATION IN A QUASI-LICENSED WIRELESS SYSTEM

RELATED APPLICATIONS

The subject matter of this application is generally related to co-owned and co-pending U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," as well as Ser. No. 16/738,889 filed Jan. 9, 2020 and entitled "METHODS AND APPARATUS FOR SERVICE PROVISION TO OUT-OF COVERAGE APPARATUS IN WIRELESS SYSTEMS," and Ser. No. 16/741,509 filed Jan. 13, 2020 and entitled "METHODS AND APPARATUS FOR RADIO CONFIGURATION IN A WIRELESS SYSTEM," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for optimization of antenna performance during provision of high-speed data services, such as for example those using quasi-licensed Citizens Broadband Radio Service (CBRS) technologies, Licensed Shared Access (LSA), TV White Space (TVWS), or Dynamic Spectrum Allocation (DSA).

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in |

TABLE 2-continued

| Frequency range | Type | Center frequency | Availability | Licensed users |
|---|---|---|---|---|
| 2.4 GHz-2.5 GHz | B | 2.45 GHz | Worldwide | Region 2 additional amateur service Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider. Comparable technologies are in development, including for instance LSA, TVWS, and DSA.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2.

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2A.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of Device Operational State and Configuration—

With increasing demand for coverage by broadband networking services, such as those delivered via use of CBRS spectrum, there is an increasing amount of wireless equipment that is being deployed for servicing such demand. One way in which broadband wireless services are provided, including at network edges (e.g., in rural areas), is by use of Fixed Wireless Access (FWA) devices. A high-level diagram showing a typical FWA device installation is shown in FIG. 3.

Under prior art schemes (see FIG. 3A), the serving network, via the transmitting base station 206 (e.g. CBSD/xNB) controls the recipient or served CPE/FWA 300, and hence is responsible for directing the device 300 with respect to which CBSD/xNB to connect with for provision of service. The CPE/FWA 300 receives the signal 322 from the designated CBSD/xNB 206b to which it is connected, and effectively treats the other signals 324 and 326 from other CBSD/xNB 206a, 206c as interference. Obviously, as more CPE/FWA 300 and base stations 206 are placed within a given geographic area, the amount of interference experienced by a given CPE/FWA will increase, and as such the need for better signal strength values between the CPE/FWA and its serving CBSD/xNB increased.

Moreover, with greater infrastructure deployment such as the FWA device of FIGS. 3 and 3A, service providers are faced with a growing amount of overhead not only to maintain the deployed equipment, but also to continuously monitor and address any issues that arise relating to such equipment, for example relating to non-optimal performance of the installed equipment, service outages, component failures, etc. Furthermore, network, environmental, and operational conditions surrounding a given Consumer Premises Equipment (CPE) installation may frequently change for various reasons, such as removal of existing base stations 401 or addition of new base stations 402 (as shown in FIG. 4) or addition of new CPE nearby (each of which can adversely affect interference experienced by the given CPE installation), and changes in RF signal propagation and losses due to e.g., addition or movement of structures such as buildings, cellular infrastructure, billboards, etc. These changes in the environment of the deployed CPE have traditionally necessitated "truck rolls" for equipment adjustment, tuning, re-installation, update, and/or troubleshooting. Notably, a CPE installed at a first time may be optimally adjusted at installation, but due to e.g., subsequent installations of other CPE nearby and interference or other effects caused thereby, may rapidly become "non-optimized." The installer/service provider cannot necessarily foresee what effects subsequent installations of other CPE may have (and in fact may not know where/when such installations may occur), and hence is often forced into necessarily reactive solutions for a constantly changing problem, such as manual adjustments via service personnel, which when considered on a large scale (such as in higher customer density regions) becomes untenable.

As more equipment is deployed, additional resources must be spent to address and respond to such changes, especially those which negatively impact the user's "experience." Long-term customer loyalty may also be adversely affected; even if such servicing or "truck rolls" are highly effective at mitigating or remedying the issues which crop up, they none-the-less devalue the service providers quality in the eyes of their customers, since unnecessary time, effort, and frustration are expended by the customers through the issue discovery/contact/resolution cycle necessitated by such scenarios.

Notably, extant CBRS architectures currently lack mechanisms for antenna optimization at a given CPE/FWA. In particular, CPEs typically include a high gain omni-directional or directional antenna mounted usually on the rooftop of a premises or venue, which in the case of a directional antenna may be pointing to the direction of a base station (e.g., CBSD/xNB antenna). At the time of installation, the CPE antenna is generally placed as optimally as possible on the roof top or a premises façade to maximize the received Signal-to-Noise Ratio, and minimize interference. For example, for an omni-directional antenna, the antenna may be mounted sufficiently high on the roof or façade such that interference within an LOS (line of sight) between the antenna and the base station is minimized. Similarly, for a directional antenna element, the main lobe of the antenna may be pointed (as close as reasonably possible) in a direction where SINR or similar is maximized (which may or may not be a direct LOS between the antenna element and the target base station). In either case, once the CPE is installed, it is rarely moved (intentionally), and in fact such subsequent movements due to e.g., loss of signal strength/quality or throughput are very costly to the service provider (e.g., "truck rolls" or other labor-intensive solutions must be utilized).

Additionally, non-optimal levels of networking service are often observed at the network edges of coverage (such as in rural areas), which similarly require truck rolls and associated cost/latency. For example, conventional directional or omni-directional CPE antennae at a cell edge will not, e.g., in poor RF conditions, be able to meet the prevailing SLA (service level agreement) requirements on a continuous basis. In some such cases, a given CPE's performance may vary (including to levels below SLA) as a function of RF conditions—which may be highly unpredictable and/or change with time—thereby further adding to customer frustration.

One feasible work-around would be to utilize a directional antenna with wider beam width or dispersion of the RF signal, either on the transmitter side and/or the receiver side, so as to in effect focus and capture more relevant RF energy and compensate for any antenna misalignment or other confounding artifacts. However, use of wider beam-width (including in the limiting case omni-directional propagation) may also cause further interference with other CPEs and base stations, especially in more densely packed use cases.

In high density environments, the CPE may also experience significant interference from the other users operating in the same frequency band or an adjacent band. Hence, the CPE may feasibly try to increase its EIRP in order to compensate for the interference, as well as path losses. However, with use of a quasi-licensed wireless system such as CBRS and the like, the CPE is capped at a comparatively low power level (e.g., EIRP no greater than 23 dBm for e.g., CBRS as discussed previously), and hence "more signal" on the CPE side is not a viable answer. Likewise, higher power by the CBSD may create additional interference for other CPE. As discussed previously with respect to FIG. 3A.

Accordingly, there is a need for improved methods and apparatus enabling dynamic configuration of wireless devices such as CBRS CPE/FWA operating within a wireless network, in order to compensate for non-optimal network or RF conditions, antennae misalignment, high levels of RF interference, or other such conditions which might otherwise necessitate service provider intervention, such as via truck-rolls (and their associated high cost and inefficiency). Ideally, these improved methods and apparatus would, inter alia, enable network providers and operators to provide dynamic adjustment of the configuration of various equipment in a time-sensitive fashion and with greater efficiency, and reduce the amount of resources required to maintain and/or achieve a desired level of service.

SUMMARY

The present disclosure addresses the foregoing needs by providing, inter alia, methods and apparatus for antenna optimization of a served CPE (such as e.g., CBRS FWA devices) in a wireless network.

In one aspect, a method for antenna optimization of a client device (e.g., CPE/FWA) is disclosed. In one embodiment, the CPE/FWA having its antenna optimized is configured to utilize CBRS quasi-licensed spectrum, the method includes measuring on or more RF propagation or channel parameters between the CPE/FWA and at least one base station, and storing the measured data in a data base.

In one variant, the method uses the measured data to optimize the antenna system performance in real time or near-real time.

In another variant, the method utilizes previously measured data from the data base relating to one CPE/FWA to optimize antenna performance for at least one other CPE/FWA.

In another embodiment, the method includes using a control loop to optimize antenna azimuth and tilt/elevation. In one implementation, the method reports the measured data to a network Support System (e.g., OSS), and receives feedback data from the network OSS.

In one embodiment of the method, the measured data includes key performance indicators (KPIs), such as data rate/throughput, latency, jitter, error rates (e.g., BER, PER), and/or various other network performance parameters such as those relating to QoS. In one implementation, the method includes using a computer program (e.g., application such as an iPerf) to measures the KPIs once the CPE/FWA has achieved an RRC Connected state with a serving base station.

In another aspect of the disclosure, a method of pre-provisioning or initial tuning of a CPE/FWA is disclosed. In one embodiment, the method includes using a range of electrical and/or azimuth actuators of the CPE/FWA to measure channel performance (which may include RF channel quality and/or connection performance), and recording the data for future (such as in the event the base station goes off-air, new CPE are added, etc.). After performing the measurements and storing the data, the CPE/FWA then reports the data to the connected base-station, and evaluates the collected data to identify a particular electrical tilt and azimuth meeting one or more prescribed criteria to use for an interim period until further (e.g., network-assisted) tuning is completed. The connected base-station may also use the received data in various ways, including passing it to a network entity (e.g., EPC or 5GC process) for further analysis and optimization of the particular CPE/FWA i.e., the aforementioned network-assisted tuning), and/or optimization of the network (or network portion) that includes the CPE/FWA, as a whole.

In a further aspect of the disclosure, a method for post-provisioning of an CPE/FWA is disclosed. In one embodiment, the method includes using, via a network process such as an OSS of the EPC or 5GC, prior data obtained by the CPE/FWA (e.g., via iPerf or other measurements) to issue commands to the CPE/FWA (and others geographically or topologically proximate thereto) to invoke re-tuning, so as enhance SINR for each of the CPE/FWA and enhance the network as a whole.

In one variant of the foregoing method, a feedback loop approach is used wherein network parameter data collected by the CPE/FWA are fed to an antenna element control system which, after processing the parameter and KPI thresholds as dictated by the network controller process (e.g., OSS), use mechanical and/or electrical internal mechanisms of the CPE/FWA to cause re-adjustment of the antenna elements, thereby resulting in physical or electronic beam-steering to acquire a direction of maximum radiation, so as to maximize the antenna gain in a link with the current serving base station. Network feedback data is looped back to the (local) antenna element control system until the optimum signal propagation path is found, whether with respect to a given base station (e.g., where only one is available, or use of that given base station is otherwise mandated or required), or alternatively for selection of the "best" base-station from a plurality of candidates accessible by the CPE/FWA.

In other embodiments, the method includes either simultaneous or sequential "tuning" of one or more CBSD/xNB antenna elements as well (using a generally similar protocol) so as to further improve the individual link quality (and the "aggregated" or overall link quality for all CPE/FWA under evaluation/control when considered as a whole).

In a further aspect of the disclosure, a closed-loop (aka "feedback") control system for use on a CPE/FWA apparatus is disclosed. In one embodiment, the system includes a local controller and feedback logic coupled to the controller, the logic configured to generate data relating to link quality or other parameters of interest for use by the controller in updating or adjusting the subsequent position or operation of the CPE/FWA.

In another embodiment, the system also includes a data interface (e.g., logical channel carried over a wireless bearer) to a network process (e.g., EPC or 5GC OSS) for (i) passing obtained KPI or other data such as relating to SRS (sounding reference signal) and/or CRS (cell-specific reference signal) to the network process, (ii) passing data relating to CPE/FWA operation, status, and testing/maintenance-related functions in support of troubleshooting of the CPE/FWA, and (iii) receipt of control data from the OSS or a proxy thereof to enable dynamic "smart" network resource allocation.

In another aspect of the disclosure, a network architecture for delivery of wireless data to at least one fixed wireless receiver apparatus (e.g., CBRS FWA) is disclosed. In one embodiment, the network architecture includes: a plurality of wireless base stations; a computerized network device in data communication with the plurality of base stations; at least one fixed wireless transceiver apparatus; at least one antenna element installed on the fixed wireless transceiver; a computerized premises device in data communication with the at least one fixed wireless transceiver; and a controller apparatus in data communication with the computerized network device. In one variant, the fixed wireless transceiver apparatus includes a plurality of electrical actuators which are logically communicative with the controller apparatus (e.g., logic) executing on the fixed transceiver, the actuators and logic configured to optimize antenna azimuth and elevation of the at least one antenna element at or after installation.

In one variant, the architecture uses a frequency range between 3.550 and 3.70 GHz inclusive, and the plurality of wireless base stations comprise CBRS (Citizens Broadband Radio Service) compliant CBSDs (Citizens Broadband radio Service Devices) utilizing 3GPP LTE or 5G NR radio technology, and which are managed by a common service provider such as an MSO.

In another aspect, controller apparatus useful for optimization of CPE antenna azimuth and tilt is disclosed. The controller is in one embodiment configured to operate in a closed-loop fashion, including to receive KPI-based feedback data from the CPE radio/antenna, and store or/and retrieve the KPI data to/from a local database for providing the antenna azimuth and tilt optimization.

In another aspect, a wireless premises device is disclosed. In one embodiment, the device includes a CBRS (Citizens Broadband Radio Service)-compliant FWA that is capable of data communication with a 3GPP compliant eNB or gNB (functioning as a CBSD) within CBRS frequency bands. In one embodiment, the CPE/FWA includes an actuator sensor interface (ASI) for, inter alia, connecting the actuators to the CPE/FWA. In an additional aspect of the disclosure, computer readable apparatus is described.

In one embodiment, the apparatus includes a storage medium configured to store one or more computer programs, such as a control system logic module of the above-mentioned FWA. In one embodiment, the apparatus includes a program memory or HDD or SDD, and is part of a CPE/FWA device and its local controller.

In another aspect, a method of operating a wireless network infrastructure including a fixed wireless receiver and plurality of base stations is disclosed. In one embodiment, each of the plurality of base stations has a plurality of independent radio frequency (RF) beams, and the method includes: transmitting at least two signals to the fixed wireless receiver from respective ones of the plurality of base stations; receiving the transmitted at least two signals at the fixed wireless receiver; obtaining data relating to one or more KPIs from each of the at least two received signals; using the KPI data to identify the most optimal received beam and/or base station; reporting the KPI data to the network; and sending at least a portion of the KPI data to a local controller module to optimize the fixed wireless device antenna azimuth and tilt relative to the identified optimal beam(s) and/or base station.

In a further aspect, a method of operating a wireless network is disclosed. In one embodiment, the method includes obtaining performance or RF characterization data from a plurality of different CPE/FWA apparatus, and utilizing the data via a network analysis and controller process to generate control data for respective ones of the plurality of CPE/FWA so as to optimize or maximize one or more operational parameters or aspects of the wireless network as a whole. In one variant, the one or more operational parameters or aspects include average, mean, or median throughput or data rate associated with each of individual CPE/FWA. In another variant, the optimization includes adjustment of all or a subset of the CPE/FWA such that each of the CPE/FWA (whether adjusted or not) exceed a target data rate or other performance metric.

In another aspect, a wireless receiver is disclosed. In one embodiment, the receiver includes a CBRS (Citizens Broadband Radio Service)-compliant FWA that is capable of data communication with the 3GPP compliant eNB or gNB. In one variant, the FWA includes antenna element and radio path controller logic for, inter alia, generating signal and/or throughput report data and transmitting it to a network controller or SAS.

In one variant, the FWA includes a premises device operated by a network operator (e.g., MSO) that is configured to communicate wirelessly with one or more CBSD/xNB devices to obtain high-speed data services and wireless backhaul from the premises. In one variant, the FWA apparatus is configured as a Category B CBSD CBRS device, and is mounted on the user's premises so as to enable the aforementioned backhaul for WLAN or wireline interfaces within the premises.

In a further aspect of the disclosure, a method adjusting one or more antenna elements of an antenna array to achieve a desired pattern is disclosed. In one embodiment, the method includes determining a beam dispersion of a transmit or receive beam; determining a desired overlap with another adjacent beam of the same array; and causing adjustment of one or more antenna elements of the array to achieve the desired overlap. In one variant, the adjustment includes adjustment in at least one of azimuth and tilt, and the overlap includes approximately thirty percent (30%).

In another aspect, a network process configured for controlling a plurality of wireless CPE is disclosed. In one embodiment, the network process includes an OSS process with logic configured to evaluate performance and/or RF-related data derived from one or multiple ones of the plurality of CPE, and generate an adjustment plan for the plurality of CPE. In one variant, the OSS process is software based with machine learning or AI (artificial intelligence) capabilities, and is configured to generate commend data useful by controllers of the respective CPE being adjusted to achieve a desired antenna array configuration.

In another aspect, network controller apparatus for enabling provision of services to out-of-coverage CPE is disclosed. In one embodiment, the controller is part of an MSO wireless network infrastructure. In one variant, the controller is integrated with or part of a 3GPP 5GC or EPC, and is communicative with logical processes on two or more CPE apparatus (via interposed RAN including Node B apparatus) to obtain performance data for subsequent or ongoing analysis and generation of pre-provisioning training and post-provisioning antenna configuration plans.

In an additional aspect of the disclosure, computer readable apparatus is described. In one embodiment, the apparatus includes a storage medium configured to store one or more computer programs, such as on a fixed wireless receiver of a managed wireless network. In one embodiment, the apparatus includes a program memory or HDD or SSD and stores one or more computer programs supporting relaying of data from a serving base station and the recipient fixed wireless receiver via one or more other fixed wireless receivers.

In a further aspect, an integrated circuit controller apparatus for use in a CPE is disclosed. In one embodiment, the IC apparatus includes configurable logic blocks for implementing radio, performance monitoring, and antenna array control functions for the CPE, based on output from local logic and/or the above-referenced network controller process.

In yet another aspect, a method for optimizing an antenna configuration of a fixed wireless device operated in a wireless network, is disclosed. In one embodiment, the method includes: obtaining channel performance data, the channel performance data relating to at least one wireless channel between the fixed wireless device and at least one base station; and utilizing at least a portion of the obtained data to optimize at least one antenna configuration of the fixed wireless device.

In one variant, the fixed wireless device includes a consumer premises device of a subscriber of a managed wireless network, and the utilizing includes generating control data for use by a controller apparatus of the fixed wireless device such that the optimization may occur either (i) autonomously without service intervention by an operator of the managed wireless network, or (ii) based on control data generated by a remote computerized process of the managed wireless network that is in data communication with the controller apparatus. In one implementation thereof, the fixed wireless device includes a CBRS (Citizens Broadband Radio Service) compliant fixed wireless access (FWA) device; and radio frequency (RF) signals associated with the at least one channel are transmitted within a frequency range between 3.550 and 3.70 GHz inclusive between the fixed wireless device and the at least one base station, the at least one base station including a CBRS compliant CBSD (Citizens Broadband radio Service Device).

In another variant, the utilizing includes iteratively providing at least a portion of the channel performance data to a controller process of the fixed wireless device in order to enable generation of respective iterative command data by the controller process.

In yet a further variant, the utilizing includes iteratively providing at least a portion of the channel performance data to a network-based controller process in data communication with the fixed wireless device in order to enable generation of respective iterative command data by the network-based controller process.

In still another variant, the utilizing at least a portion of the obtained data to optimize at least one antenna configuration of the fixed wireless device includes causing adjustment of at least one of antenna element of the fixed wireless device in at least one of azimuth or elevation so as to maximize an antenna gain parameter. The at least one of antenna element of the fixed wireless device includes for example a directional antenna element having a prescribed transmit or receive beam dispersion associated therewith, and the optimization includes calculating a prescribed degree of overlap with at least one other adjacent beam.

In another variant, the obtained data includes data relating to one or more key performance indicators (KPIs) selected from the group consisting of latency; error rate; and jitter.

In a further variant, the obtaining channel performance data, the channel performance data relating to at least one wireless channel between the fixed wireless device and at least one base station includes obtaining a plurality of channel performance data each relating at least one wireless channel between respective ones of a plurality of fixed wireless devices and respective ones of base stations; and the utilizing at least a portion of the obtained data to optimize at least one antenna configuration of the fixed wireless device includes utilizing the plurality of data to generate an adjustment plan for the plurality of fixed wireless devices, the adjustment plan configured to optimize at least one performance parameter for at least a first subset of the plurality of wireless devices. The adjustment of at least a second subset of the plurality of wireless devices is for example in accordance with the adjustment plan.

In a further aspect, a computerized premises apparatus for use in a wireless infrastructure is disclosed. In one embodiment, the computerized premises apparatus includes: digital processing apparatus; an antenna system including an antenna array having a plurality of antenna elements and at least one actuation apparatus configured to change at least one aspect of the operation of at least one of the plurality of antenna elements; controller apparatus in data communication with the antenna system and the digital processing apparatus and configured to control the actuation apparatus; and a storage device in data communication with the digital processing apparatus, the storage device including a storage medium having at least one computer program.

In one embodiment, the at least one computer program is configured to, when executed on digital processing apparatus, cause the computerized premises apparatus to: determine channel performance data based on radio frequency signals transmitted from or received by the antenna system; cause storage of the determined performance data; and cause analysis of at least a portion of the determined performance data to determine a first configuration for the antenna system, the first configuration providing a desired level of performance for at least one communication channel between the computerized premises apparatus and a node in the wireless network.

In one variant, the computerized premises apparatus includes a CBRS (Citizen Broadband radio Service)-Compliant FWA (fixed wireless access) device that is capable of data communication with the 3GPP compliant eNB (eNodeB) or gNB (gNodeB) via at least one CBRS band carrier frequency within the band of 3.55 to 3.70 GHz, the FWA device configured to operate at a power level less than or equal to 23 dBm.

In another variant, the actuation apparatus includes: (i) an electromechanical tilt actuator configured to change an angle of elevation of the at least one of the plurality of antenna elements; and (ii) an azimuth actuator configured to change an azimuth of at least one of a) the at least one of the plurality of antenna elements individually, or b) the antenna array as a whole.

In still a further variant, the at least one computer program is further configured to, when executed on digital processing apparatus, cause the computerized premises apparatus to transmit the determined performance data to a network-based computerized process via the at least one communication channel. The causation of the analysis of at least a portion of the determined performance data to determine a first configuration for the antenna system includes causing the network based computerized process to perform an algorithmic analysis of at least the transmitted determined performance data to enable generation of command data to be used by the controller apparatus after receipt of the command data by the computerized premises apparatus from the network-based process.

In another aspect of the disclosure, a computer readable apparatus for use in a fixed wireless apparatus is described. In one embodiment, the computerized readable apparatus includes a storage medium configured to store one or more computer programs, the one or more computer programs configured to, when executed on a processing apparatus of the fixed wireless apparatus: cause a controller apparatus of the fixed wireless apparatus to execute a training plan, the training plan causing at least one antenna element of the fixed wireless device to implement an adjustment to at least one of a transmit or receive beam configuration or position; obtain data relating to at least one wireless channel of the fixed wireless apparatus data from a monitoring process operative to execute on the fixed wireless apparatus, the obtained data relating to at least a first time period before and a second time period after the adjustment; and utilize the obtained data to generate output data indicative of at least one of radio frequency (RF) signal strength or wireless data channel performance as a function of the adjustment.

In one variant, the one or more computer programs are further configured to, when executed on a processing apparatus of the fixed wireless apparatus, utilize at least a portion of the output data to generate feedback data for provision to the controller apparatus during post-provisioning operation of the fixed wireless apparatus, the feedback data configured to enable the controller apparatus to dynamically adjust the at least one antenna element in order to maintain or achieve a desired level of performance for the at least one wireless channel autonomously without service personnel intervention.

In another variant, the training plan includes adjustment of at least one of azimuth or elevation of the at least one antenna element in increments to a plurality of respective different positions over a period of time; and the obtainment of data relating to at least one wireless channel of the fixed wireless apparatus data from a monitoring process operative to execute on the fixed wireless apparatus, the obtained data relating to at least a first time period before and a second time period after the adjustment, includes obtaining data relating to data rate or throughput for the at least one wireless channel for each of the plurality of respective different positions.

In yet a further variant, the training plan includes adjustment of at least one of azimuth or elevation of the at least one antenna element in increments to a plurality of respective different positions over a period of time; and the obtainment of data relating to at least one wireless channel of the fixed wireless apparatus data from a monitoring process operative to execute on the fixed wireless apparatus, the obtained data relating to at least a first time period before and a second time period after the adjustment, includes obtaining data relating to radio frequency signal strength within a prescribed frequency band for each of the plurality of respective different positions. For example, in one implementation, the utilization of the obtained data to generate output data indicative of at least one of radio frequency (RF) signal strength or wireless data channel performance as a function of the adjustment includes generation of an RF heat map data structure, the heat map data structure configured to enable correlation of at least one of azimuth or elevation of the at least one antenna element to a local maximum in RF signal strength for signals emanated from at least one wireless base station within wireless range of the fixed wireless apparatus.

These and other aspects shall become apparent when considered in light of the disclosure provided herein.

BRIEF DESCRIPTION OF THE DRAWINGS

FIG. 7 is a composite view of one embodiment of the articulated antenna apparatus of the disclosure, illustrating top and side views, as well as transmit/receive beam configuration and parameters related thereto.

FIG. 8 is a functional block diagram illustrating one embodiment of an exemplary CPE/FWA apparatus with antenna adjustment capability according to the present disclosure.

Figure 1:
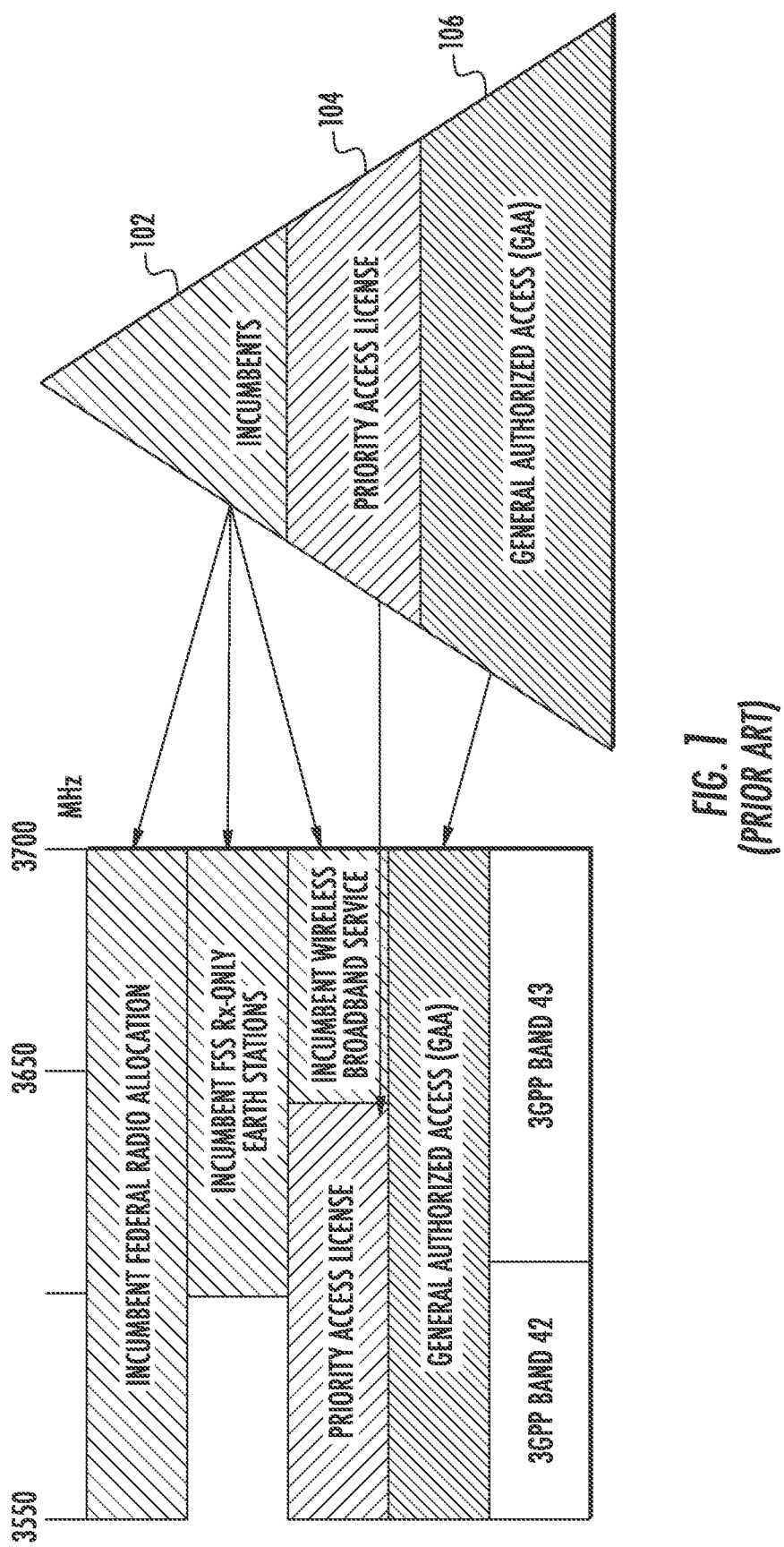
FIG. 1 is a graphical illustration of prior art CBRS (Citizens Broadband Radio Service) users and their relationship to allocated frequency spectrum in the 3.550 to 3.700 GHz band.

All figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, or a cellular xNB.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)— Citizens Broadband Radio Service Device (CBSD) Interface Technical Specification*—Document WINNF-TS-0016, Version V1.2.1.3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one salient aspect, the present disclosure describes methods and apparatus for optimizing CPE antenna position, orientation and beam configuration within a power-limited system so that maximal data rates and performance can be achieved, including after installation and in high-density applications where proper antenna alignment and beam configuration are critical.

In one embodiment, the methods and apparatus utilize so-called "quasi-licensed" CBRS (Citizens Broadband Radio Service) wireless spectrum in conjunction with a controller architecture that dynamically optimizes the antenna orientation and transmit/receive beam resources in an installed fixed wireless apparatus (FWA) for optimum delivery of services to user or subscriber premises.

In one configuration, the CPE/FWA includes indigenous control logic that obtains signal and performance data via its antenna elements and radio head, and uses the data to adjust the antenna elements so as to optimize performance of the CPE/FWA (as well as aid in optimization of other nearby CPE/FWA devices in some scenarios). Extant performance or signal quality measurements resident within the underlying wireless protocols (e.g., SRS and CRS data associated with 3GPP channel quality estimates) may also be leveraged for characterizing the wireless environment and as inputs to the CPE optimization process.

The CPE's local control logic may also in some variants be supported by a network-based operations support system (OSS) disposed with the service provider's infrastructure (such as at a headend, EPC, or 5GC thereof, or even more locally within a 5G gNB CU tasked with controlling a plurality of DU's), such that a more "global" perspective can be obtained for coordination of a given CPE/FWA with others in the area, than through use of the localized CPE/FWA controller itself.

As such, CPE/FWA antenna system optimization as described herein provides the capability for enhancing the performance and data rates at consumer premises, including in post-installation scenarios where base station inventory changes, more local CPE are added, and/or RF propagation paths change due to e.g., natural or man-made effects. This capability also advantageously obviates maintenance calls or "truck rolls" and other network operating expenses, and enhances customer satisfaction through reduced-latency correction of performance issues, and accelerated new service velocity.

The methods and apparatus described herein can also advantageously be extended to other shared-access architectures (i.e., other than CBRS) such as for example DSA, LSA, and TVWS systems, as well as those utilizing (fully) licensed and/or unlicensed RF spectrum.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi-licensed" or shared access systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Further, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Antenna Optimization Architecture—

Figure 5:
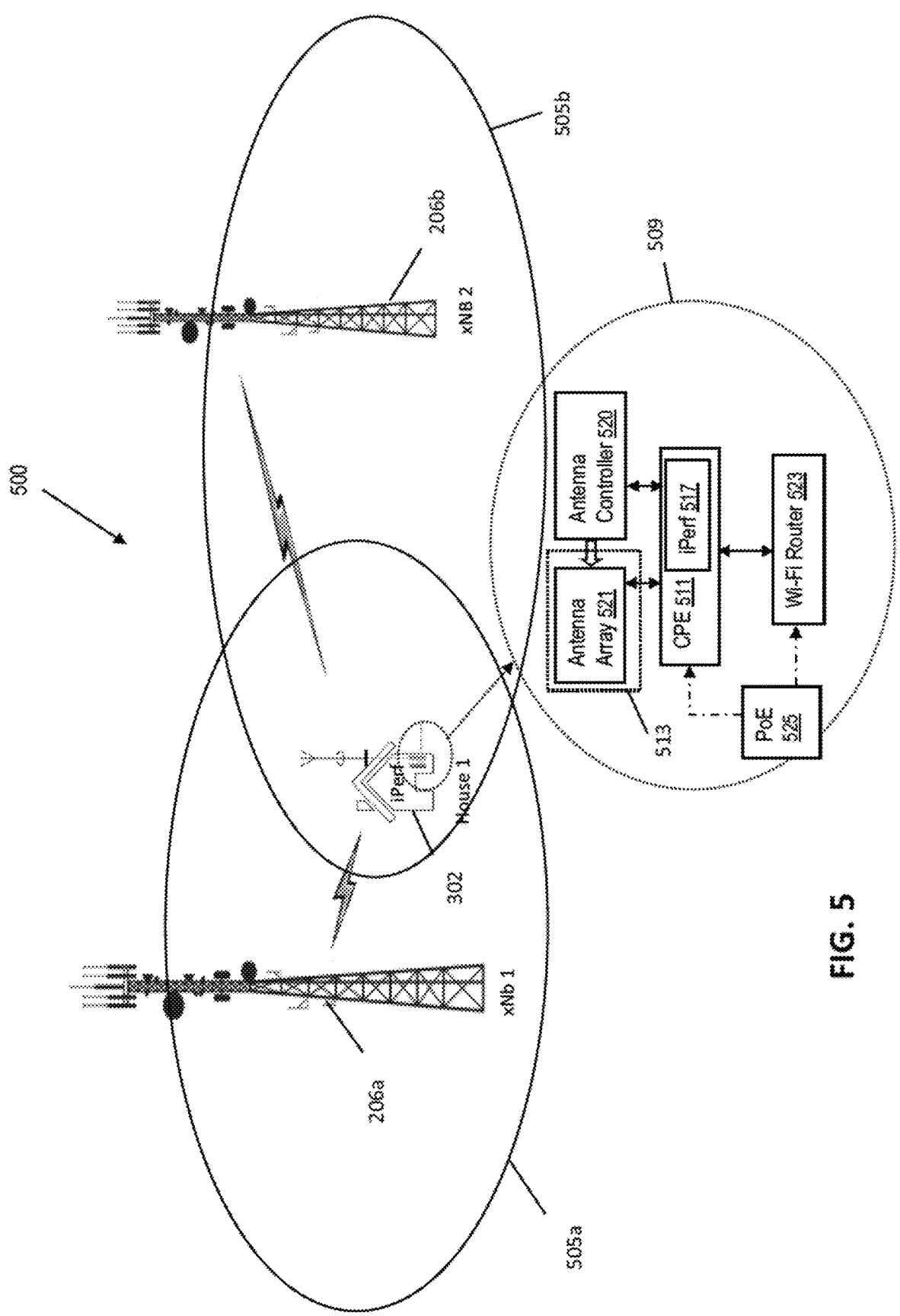
FIG. 5 is a graphical representation illustrating an exemplary embodiment of a CPE/FWA within service range of two base stations (CBSD/xNBs) according to the present disclosure.

FIG. 5 illustrates an exemplary CPE/FWA antenna optimization architecture 500 according to the present disclosure. As illustrated, the architecture includes an inventive CPE/FWA 509 (described in greater detail below) disposed at/on a premises, such as a customer house or building. The CPE/FWA 509 is served in this example by two base stations (xNB 1 206*a* and xNB 2 206*b*) having respective coverage areas 505*a*, 505*b*, within which the instant CPE/FWA 509 lies, although it will be appreciated that other numbers and/or types of base stations may be used to service the CPE/FWA 509. Moreover, it will be appreciated that instead of base stations, other CPE/FWA apparatus configured for supplementation or out-of-coverage service to the instant CPE/FWA 509 may be used to provide services, such as those described in co-pending U.S. patent application Ser. No. 16/738,889 filed Jan. 9, 2020 and entitled "METHODS AND APPARATUS FOR SERVICE PROVISION TO OUT-OF-COVERAGE APPARATUS IN WIRELESS SYSTEMS", as well as U.S. patent application Ser. No. 16/676, 188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety. For example, as described therein, wireless coverage for an exemplary unlicensed or quasi-licensed CPE that is at or beyond a coverage "edge" of a given network (or is otherwise experiencing less-than-adequate signal strength for whatever reason) may be provided service via "relay" and/or supplementation of services from a better-positioned "in coverage" CPE of the same network. As such, the various radios and antenna elements (and decision logic) of the various embodiments of the present disclosure can be used to great advantage in such operational scenarios, such as to enable establishment of one or more wireless connections between respective ones of the sectorized radios and corresponding CBSDs within suitable range thereof, including pursuant to 3GPP "D2D" mechanisms.

Figure 2:
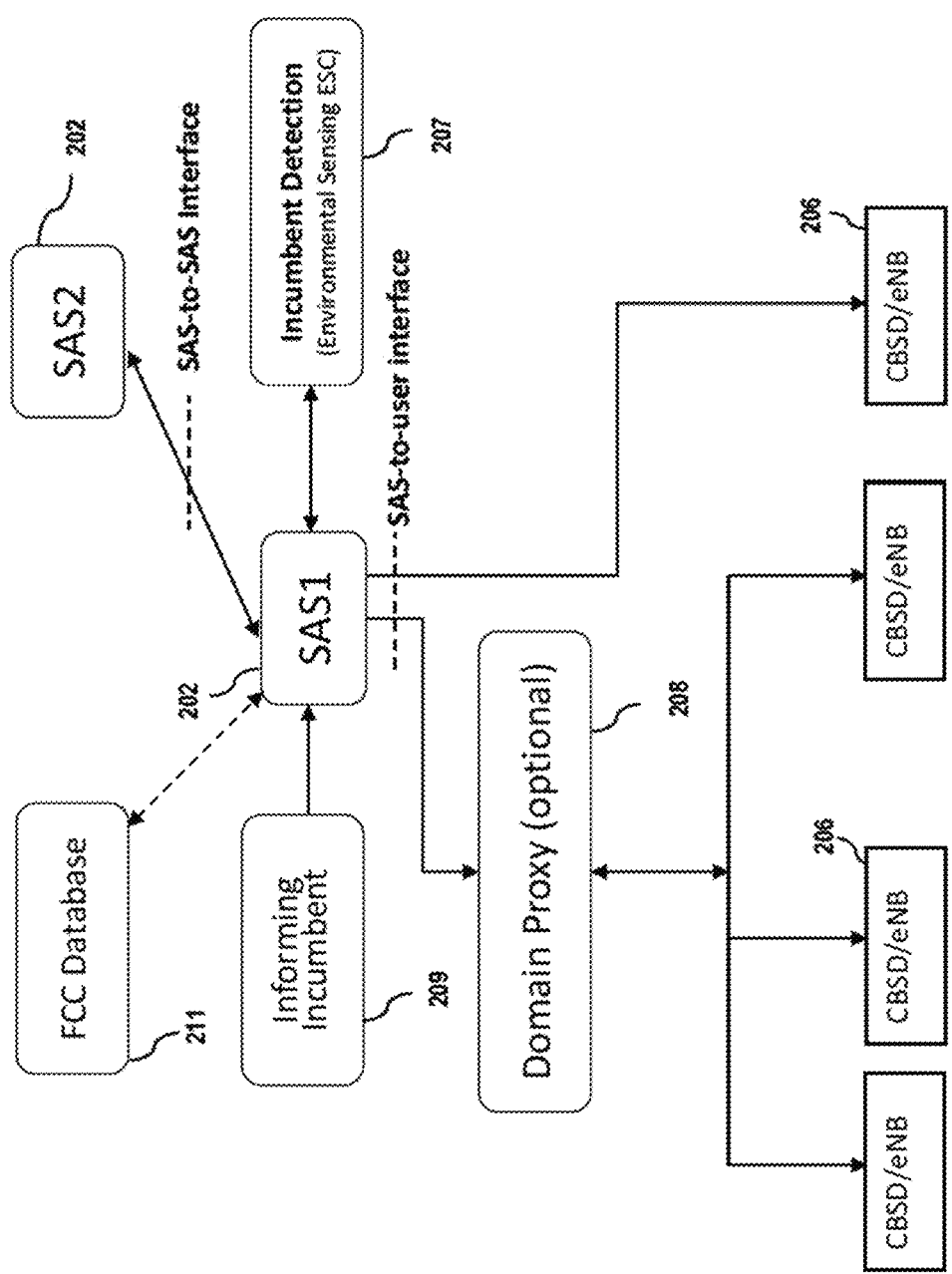
FIG. 2 is a block diagram illustrating a general architecture for the CBRS system of the prior art.
Figure 2A:
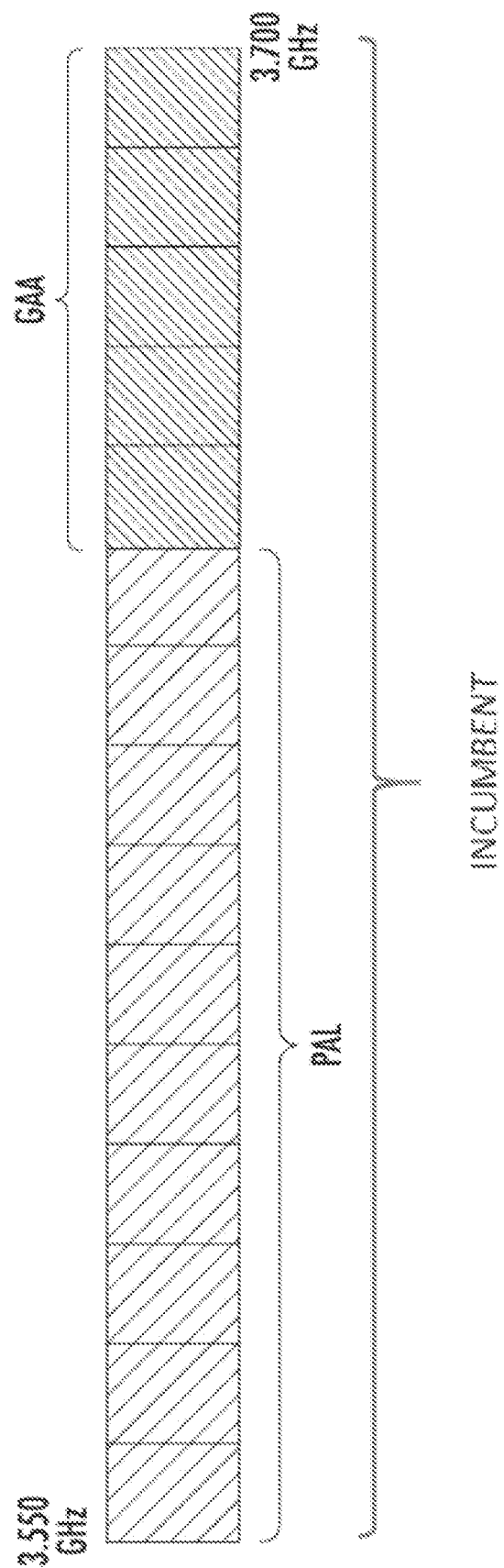
FIG. 2A is a graphical representation of allocations for PAL versus GAA users within the frequency band of FIG. 2.
Figure 3:
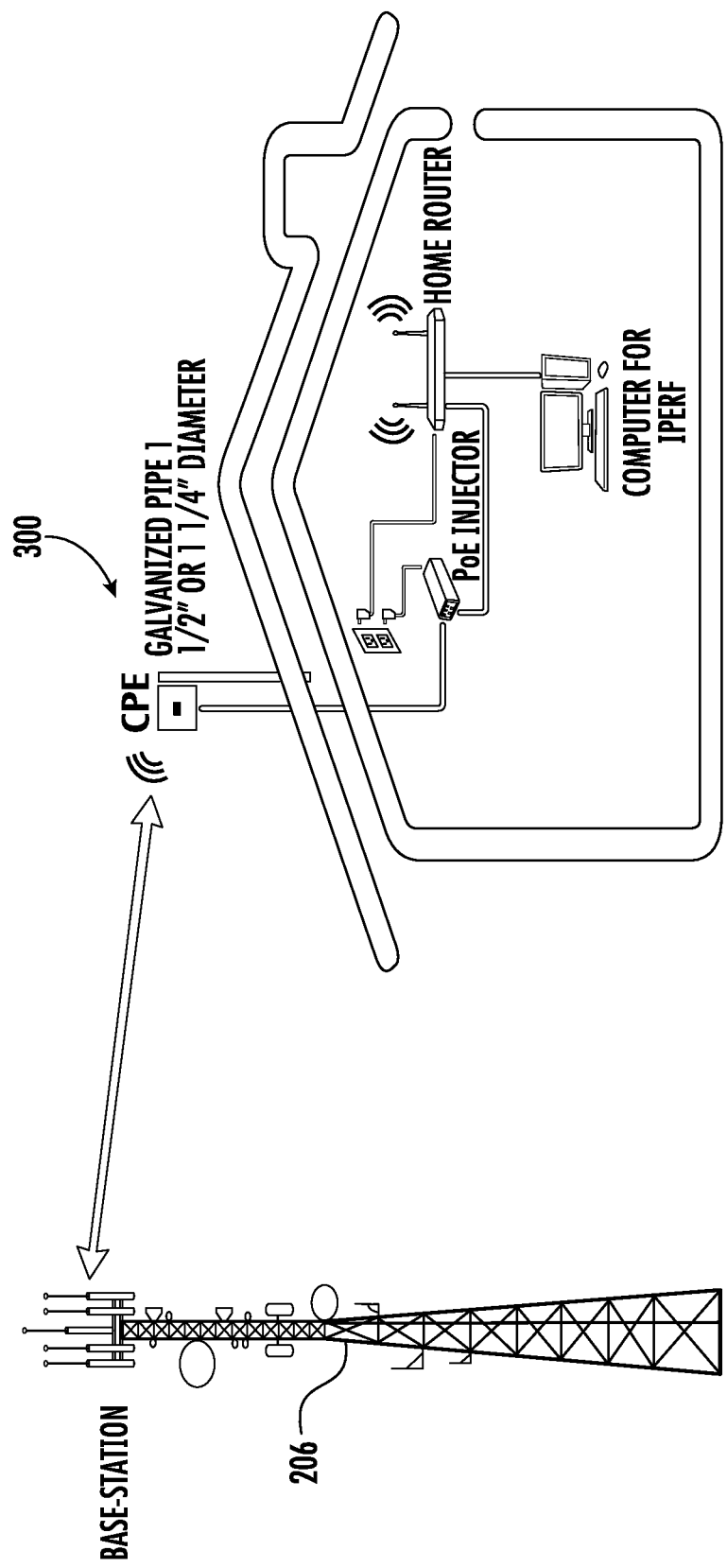
FIG. 3 is a graphical representation illustrating a prior art architecture for delivery of information from a base station (CBSD/xNB) to a CPE/FWA device, and from the CPE/FWA to an end user within the coverage area of the (CBSD/xNB).
Figure 3A:
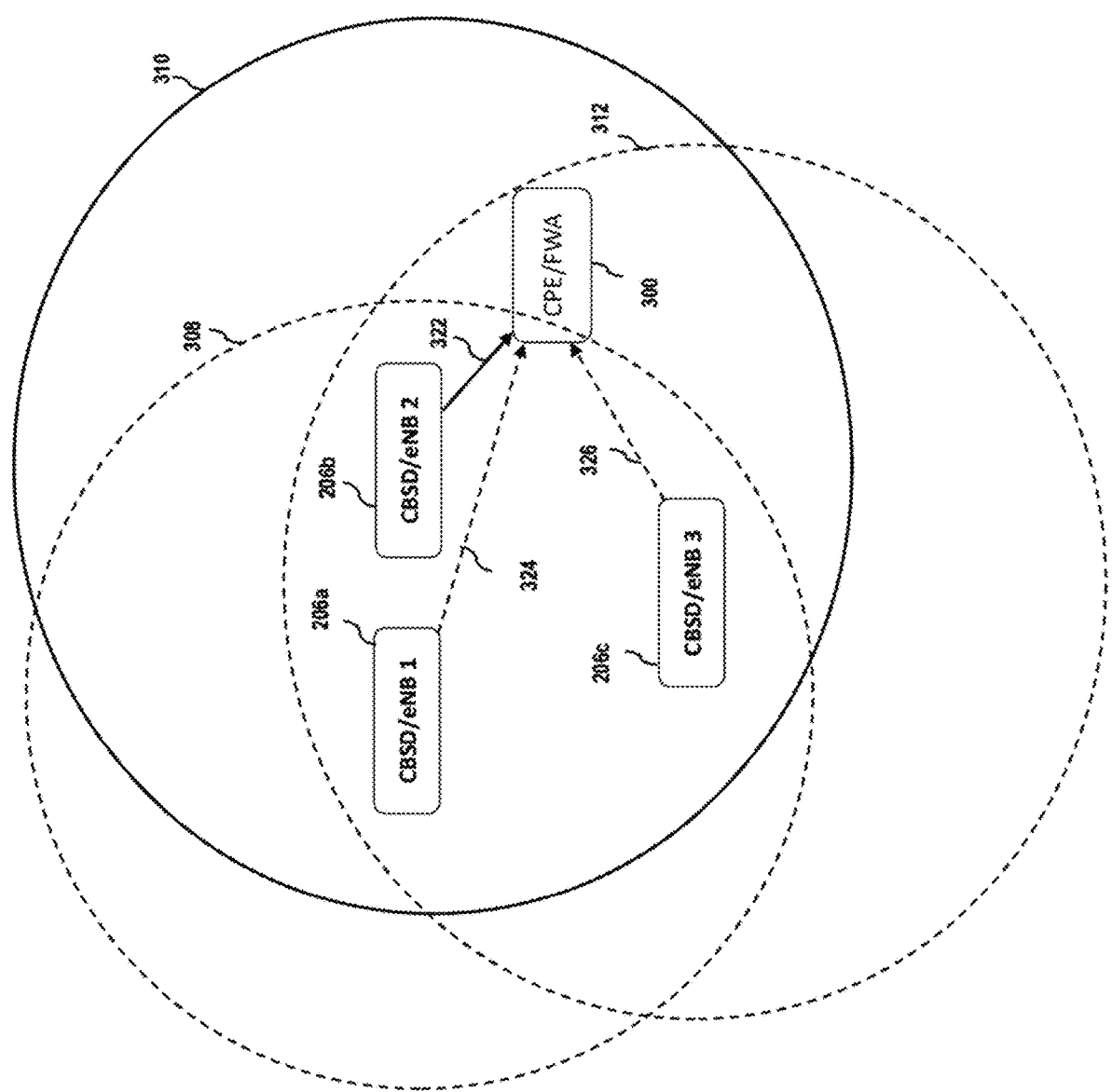
FIG. 3A illustrates a prior art CPE/FWA operating within range of three different base stations.

Returning again to FIG. 5, the illustrated CPE/FWA 509 includes a CPE device 511 (e.g., a gateway, DSTB, modem, or other such form factor of computerized premises device), Wi-Fi or other routers 523, PoE apparatus 525 (such as in the architecture of FIG. 2B discussed above), one or more antenna elements 521, and performance monitoring (e.g., "iPerf" or other performance assessment logic or software) agent 517.

As discussed in greater detail below, in the exemplary embodiment, the iPerf agent at each inventive CPE/FWA 509 measures (depending on its connection status) key performance indicators (KPIs) such as data throughput (TP), latency and jitter, which are useful in assessing the needs and capabilities of each individual premises.

The CPE/FWA logic may also be configured to utilize one or more signals indigenous within the underlying air interface protocols (e.g., 3GPP LTE/LTE-A or 5G NR in the exemplary configurations described herein) to assess signal quality for a given antenna element or set of elements (e.g., within a spatial diversity/MIMO group), such as SRS (sounding reference signal) for uplink (UL) signals, and CRS (cell-specific reference signal). As a brief aside, reference signals such as SRS and CRS in LTE support various functions, including channel estimation for MIMO decoding (demodulation), determination of PMI/CQI/RI feedback, and determination of multi-user resource allocation (scheduling). In a downlink (DL), the cell-specific reference signals (CRS) are transmitted by the eNB on unique resource elements for each antenna port, and are allocated in frequency and time. Since the CRS for each antenna port are mutually orthogonal to one another, channel estimation techniques such as interpolation can be used to determine estimates for the MIMO channel. This channel estimate can be used to derive PMI, CQI and RI feedback to determine the transmission scheme, and additional CQI reports may be requested from a given UE by the eNB for the purpose of multiuser scheduling.

In the UL direction, the reference signal scheme is different from that of the DL to that of the downlink, since each UE must transmit its own reference signals to the eNB. Two types of uplink reference signal are utilized in 3GPP; Demodulation Reference Signals (DM-RS) and Sounding Reference Signals (SRS). DM-RS are used to support data demodulation, and are transmitted only on the resource block to which that UE is allocated. The DM-RS signals are derived from Zadoff-Chu (CAZAZ) sequences, and hence channel impulse response can be estimated by cross-correlation with a copy of the transmitted signal.

Sounding reference signals (SRS) support multiuser scheduling, and enable the eNB to estimate the channel quality between each UE and the eNB over the entire system bandwidth (versus on a per resource block basis). Generally, SRS are transmitted only on request by the eNB, and only within the last SC-FDMA symbol of a subframe. The sounding bandwidth is also configurable, including allowing the eNB to "trade-off" between accuracy and reference signal overhead.

Hence, the mechanisms for assessing channel quality present within for example the underlying LTE (or 5G NR) protocols may be leveraged by the logic of the CPE/FWA 509 in gathering information for subsequent evaluation/analysis, whether by the CPE/FWA locally, by one or more network processes, or combinations thereof.

In addition, the exemplary CPE/FWA is configured in some embodiments to measure in one or more RF parameters (e.g., prior to achieving any connected state with a base station), such as RSSI, RSRP, RSRQ for each antenna element within a prescribed frequency range via its installed radios and associated RF front ends. As such, the CPE/FWA 509 can act somewhat as a spectrum analyzer to canvass the existing RF spectrum, such as during pre-provisioning, or even after installation/initial provisioning.

It will be appreciated that the use of exemplary performance measurement (e.g., iPerf) processes at the CPE/FWA device 509 (and at others generally in proximity thereto; see subsequent discussion herein) advantageously allows for a very low-overhead and efficient mechanism by which to judge whether a given CPE/FWA is deficient or overperforming in terms of one or more criteria relating to e.g., its SLA. Moreover, in cases where the CPE/FWA is used for possible supplementation or relay of signals to another CPE/FWA (as referenced above), the iPerf measurements and/or other data can be used to evaluate whether that CPE/FWA can sustain provision of such services to one or more other (i.e., out of coverage or OOC) CPE/FWA. Specifically, using a performance-based mechanism such as iPerf in the exemplary embodiments obviates more sophisticated analyses of channel conditions; rather, the net or actual user-plane performance of any given link and its associated channel conditions at any given time are readily determined and used as a basis of determining whether any changes in CPE/FWA configuration (such as changes in azimuth or elevation of a given antenna element, change to a new serving base station, utilization of different spatial diversity or MCS scheme, use of supplementation from a second base station or another CPE/FWA in tandem, etc.) is required.

It will be appreciated, however, that SLAs for OOC premises may also be established initially at levels known to be supportable by other (primary) CPE, such as based on installation testing, or iPerf analysis of the other CPE in "worst case" conditions. For instance, if it is known that a maximum theoretical SLA for the OOC CPE is (based on worst-case scenarios for all eligible primary CPE) is X Mbps in UL and Y Mbps in DL, then the SLA for that OOC CPE may purposely not be established above those values, thereby avoiding customer disappointment or frustration. If subsequently additional capacity becomes available, then the OOC device can be given "upgrades" on its SLA, whether explicitly by contract, or implicitly via added capacity when available even with no formal commitment by the MSO to do so.

Figure 6:
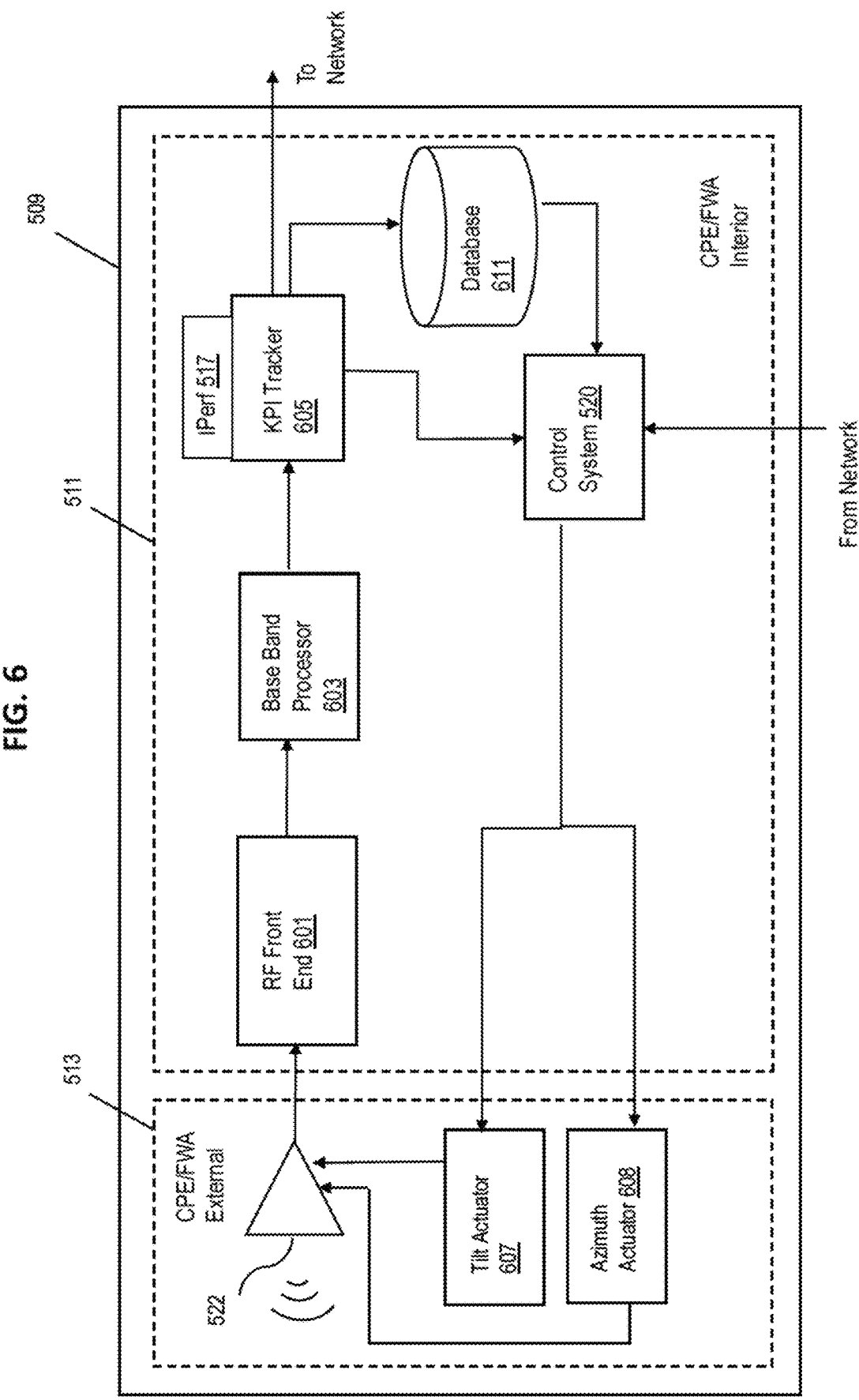
FIG. 6 is a logical block diagram of one exemplary embodiment of antenna controller operation according to the present disclosure.

FIG. 6 is a logical block diagram of one exemplary embodiment of antenna controller apparatus and operation thereof according to the present disclosure. In this example, the controller logic is part of the CPE/FWA 509 utilizing quasi-licensed frequency bands such as CBRS, and is generally closed-loop in configuration (i.e., utilizes at least some form of output—here relevant like or performance data—as a feedback input). Within the generalized apparatus of FIG. 6, the CPE/FWA includes an RF front end 601, a baseband processor 603, a KPI tracker process 605, including an iPerf process 517 integrated therein, a local database 611, and a control system module 520. Additionally, the CPE/FWA includes antenna elements 522 (see FIG. 5) that are installed usually on the rooftop or a façade of the premises, as well as an azimuth actuator 608, and a tilt actuator 607. The actuators can be mechanical actuators (such as e.g., mechanical assemblies driven by motors capable of precise adjustment such as stepper motors or the like), or electronic actuators (e.g., RF switches, varactors), or combinations of the foregoing. Moreover, as described in greater detail below, each of the antenna elements 522 is also capable of forming transmit/receive beams (see FIG. 7) at prescribed angles, whether steered mechanically and/or electronically.

The components of CPE/FWA 509 shown in FIG. 6 may be individually or partially implemented in software, firmware or hardware. The RF front end 601 includes RF circuits to operate in e.g., quasi-licensed or unlicensed spectrum (e.g., CBRS GAA or PAL, NR-U, C-Band, etc.). The front-end module 601 converts the radio frequency signals received via the connected antenna element(s) 522 to baseband signals to be processed by the baseband processor 603. The baseband processor 603 includes baseband signal processing and radio control functions, including in one variant Layer 2 functions such as media access control (MAC). The KPI tracker process 605 of the illustrated embodiment collects and tracks KPI data associated with a given connection (and hence base station or serving CPE/FWA in the case of supplementation) such as throughput, latency, jitter, error rates, using the iPerf client 511. The collected information is saved in the database 611, including for formation of historical profiles associated with the various base stations or other devices with which the CPE/FWA 509 may communicate (e.g., those within signal range).

The control system module 609 uses the collected KPI data produced by the KPI tracker 605 or from the database 611, and generates the control data/commands to adjust antenna azimuth and/or tilt. The actuators 607 and 608 receive the control commands from the control module 609, and adjusts the azimuth and tilt of the antenna element(s) 522 accordingly.

As shown in FIG. 6, the KPI tracker process 605 may also be configured to provide KPI and other data (e.g., RF spectrum canvassing data obtained via the antenna elements and RF front end 601) to a network process such as an OSS (operations support system) disposed within e.g., the MSO headend, a 3GPP EPC or 5GC core entity, or even within a CU (controller unit) of a 5G NR gNB used to control multiple DUs (distributed units) associated with the gNB. As discussed in greater detail subsequently herein, in some embodiments, the network process is used to supplement or even replace evaluation by onboard logic within the CPE/FWA 509 itself of the measured KPI or RF data in order to determine control system adjustments for the antenna. Such evaluation data (or even direct control command for provision to the actuators 607, 608) generated by the network process such as an OSS is received at the control system 520 as shown in FIG. 6. In one variant, the logical channels established between the CPE/FWA 509 and the OSS are borne on underlying wireless physical channels established between the CPE/FWA and its serving xNB at any given time, and backhaul from that xNB to the EPC/5GC core or MSO headend, although other approaches may be used, including alternate "side" channels or bearers that may exist between the premises and a network node (whether within or external to the serving RAN and its associated wireless infrastructure). In that the performance data and subsequent evaluation or control data to/from the CPE/FWA 509 are not particularly time sensitive (e.g., adjustments are contemplated to be made on a progressive or iterative basis over a period of time in some cases), resource contention and mapping to extant channel bearers (e.g., data or control channels of the underlying 3GPP protocols, or higher layer channels) is generally avoided and not a salient issue.

Moreover, in some variants, the CPE/FWA tracker process and control system logic is configured so as to start with, or "fall back" on, purely local or indigenous data and evaluation conducted by the CPE/FWA 509 itself, including for instance in cases of (i) initial pre-provisioning such as for coarse initial adjustments; (ii) during post-provisioning of the device 509, such as when requisite SLA levels are not being met and no network/OS S assist is available; or (iii) where there is only a single or limited number of base stations eligible to serve the CPE/FWA, and no significant other interferers affecting the CPE/FWA being optimized, thereby reducing the evaluation and analysis to a much simpler problem (e.g., where a sufficiently close adjustment generated by the CPE/FWA itself is sufficient to meet/exceed SLA requirements since the prevailing interference level is low and signal strength from a serving base station is good). It will also be appreciated that while a single antenna element 522 is shown in FIG. 6 for purposes of clarity, various different configurations are contemplated herein, such as e.g.; (i) one tilt actuator and one azimuth actuator per single (discrete) antenna element within an array of multiple antenna elements; (ii) one tilt and one azimuth actuator per two or more "ganged" antenna elements (e.g., two or more antenna elements juxtaposed so as to form a common mechanical assembly); and (iii) one tilt actuator and one azimuth actuator for a single omnidirectional antenna element. Moreover, the present disclosure contemplates changes in azimuth of the antenna array as a unit; e.g., by rotation of the array around a vertical or other central axis of the array.

FIG. 7 is a composite view of one embodiment of the articulated antenna apparatus of the disclosure, illustrating top and side views, as well as transmit/receive beam configuration and parameters related thereto. As shown, this embodiment of the CPE/FWA antenna array 521 includes a plurality (e.g., 6 or 8) individual elongate antenna elements 522 disposed in a generally radial fashion around a central axis (Z). In this embodiment, each element of the array 521 is individually controllable within a prescribed range of azimuth ($\varphi$) and elevation or tilt ($\theta$) angles, such as +/−10 degrees, by corresponding electro-mechanical/electrical azimuth and tilt actuators 607, 608 of the type previously described. As such, each antenna element 522 can be individually positioned relative to others in the array 521 so as to e.g., maximize one or more desired parameters such as throughput, SINR, etc.

In general each transmit/receive beam 710 generated by a given antenna element 522 is oriented in a direction orthogonal to the plane of the antenna element face as shown; however, this is but merely one configuration, and the present disclosure contemplates implementations where this is not the case, including electronic generation of beams via two or more discrete elements (including sub-elements of a given antenna element 522, not shown, or by two or more different antenna elements). Beam dispersion can also be adjusted via e.g., electronic means or use of narrow dispersion antenna elements; this approach has the advantage of reducing unwanted overlap or interference with other antenna elements of the same CPE/FWA, as well as other CPE/FWA that may be operating in the area. This capability is enabled in large part due to the post-installation adjustment capability of the inventive CPE/FWA 509; under prior art paradigms, not only would precise alignment of such narrow dispersion beams with a serving base station be required at initial installation in order to obtain sufficient channel quality, but such installations would also be very unforgiving in terms of subsequent (post installation) variations in position, changes in RF propagation paths due to man-made or other sources, removal or deactivation of the serving base station, etc. In contrast, the inventive CPE/FWA 509 may, whether autonomously or with network assistance, dynamically reposition itself under such scenarios to re-acquire the serving base station (or stablish connection with a new one), all without need for service personnel intervention at the premises.

The foregoing combination of narrow beam dispersion and dynamic adjustment capability also cooperate to enable, inter alia, higher CPE and customer density within a given geographic area. Specifically, interference levels generated by each antenna element of the CPE/FWA 509 for neighboring elements (and neighboring CPE) are reduced due to narrow dispersion (i.e., the beams can be very precisely pointed in a desired direction and maintained that way throughout the installation lifetime of the CPE/FWA), and hence more CPE can be packed into a neighborhood, city, region, etc. without exceeding requisite interference levels for each operating CPE. As a coarse analogy, many more conversations can co-exist in a finite room full of people when each is whispering into another's ear, as opposed to trying to shout over the prevailing din. As such, radiated RF energy (as measured by e.g., EIRP) from each antenna element can be reduced without sacrificing channel quality or throughput as compared to systems with less precise/broader dispersion transmit/receive beams.

As discussed in greater detail below, the foregoing advantage can also be leveraged by the network at a higher level of abstraction; by utilizing narrow beam widths and maintaining precise alignment over time for each antenna element in use, and replicating such functionality across all managed CPE/FWA within a given area, the network operator (process) can maximize throughput across the managed CPE/FWA of its customers, whether on an individual or statistical basis.

FIG. 8 illustrates an exemplary implementation of a CPE (e.g., FWA or other device) 509 configured according to the present disclosure. As shown, the CPE includes, inter alia, a CPU processor apparatus or subsystem 845, a program memory module 850, mass storage 848 (including a database with iPerf and RF data relating to various detected CBSDs or other entities proximate to the CPE/FWA 509), CPE controller logic module 520, one or more front end wireless network interfaces 601 for communication with e.g., CBSD/xNB, DP (if any), the MSO network and RAN 829, as well as one or more back end interfaces 859 such as for establishment of a WLAN AP within the served premises, Gigabit Ethernet or other LAN connectivity, support of home or premises gateways, DSTBs, UE's etc. within the premises, etc., and for communicating with e.g., local equipment such as test/configuration devices or terminals.

At a high level, the CPE/FWA 509 includes two (2) sub-elements; i.e., an outdoor portion 513, and an indoor or processing portion 511. The outdoor portion 513 in the exemplary embodiment includes one or more antenna tilt and azimuth actuators 607, 608 (see FIG. 6), as well as RF front end components necessary for receipt and processing of the RF signals, including logic to determine radio path parameters of interest such as amplitude/RSSI, phase, timing.

As indicated by its name, the CPE outdoor module or radio head 513 is typically disposed on a premises structure (e.g., rooftop, tower, utility pole, etc.) outdoors so as to minimize intervening interfering structures and RF signal attenuation as much as possible. The indoor unit 511 is in communication with the outdoor unit via e.g., interposed coaxial cable or other medium, and includes logic responsible for detecting and demodulating the received RF signals from different paths (received via e.g., different ones of the antenna elements 522) and combining them into one logical data stream (and converting to an appropriate protocol for distribution within the premises such as IEEE Std. 802.3 Ethernet packets. Combination of the received constituent signals (e.g., user data accessed via the assigned TDD slots and carrier(s) and beams) is accomplished in one embodiment via stream, CBSD/xNB and beam ID data (i.e., each stream of data from the different beam from a different contributing CBSD/xNB 206 will have unique ID data that can be used to temporally reconstruct the packet data associated with that stream in proper order and relation).

In the exemplary embodiment, the processor 845 may include one or more of a digital signal processor, microprocessor, field-programmable gate array, GPU, or plurality of processing components mounted on one or more substrates. The processor may also comprise an internal cache memory, and is in communication with a memory subsystem 850, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1302.

The processor 845 is configured to execute at least one computer program stored in memory 850 (e.g., a non-transitory computer readable storage medium); in the illustrated embodiment, such programs include logic to implement the KPI tracker functions, and radio path controller logic (RPC) 866. Other embodiments may implement such functionality within dedicated hardware, logic, and/or specialized co-processors (not shown).

The CBRS stack of the CPE 509 is implemented and controlled via the RPC controller process (logic) 866 of the CPE such that CBSD/xNB-to-CPE communication protocols are used to enable the RF detection and reporting, and scheduling/asset assignment data receipt functionality previously described, including CPE functions such as (i) generation and transmission of periodic, on-demand or ad hoc RF detection reports; and (ii) receipt of network controller-generated TDD slot, carrier, and CBSD/xNB and wireless beam assignments. The logic 866 may also manage other aspects of CPE/FWA operation, including "intelligent" monitoring and storage of data for use in e.g., historical characterizations of the various CBSD/xNB in radio range of the CPE/FWA in terms of signal strength, signal stability, azimuth, receive beam configuration, cell or base station identifiers, and the like. Management of SRS and CRS data obtained by the CPE/FWA 509 is also performed in one embodiment by the RPC logic 866.

The KPI tracker logic 605 and iPerf logic 517, and control system logic 520 enable measuring and storing the KPI data and other data (e.g., RF parametric data) in the database, tracking the received signal from several base stations (or supplementing FWA), and selecting the best serving base station/FWA as previously described, including generation of the control commands for adjusting antenna azimuth and tilt in order to optimize channel or link performance and mitigate interference. The controller logic 520 also includes an antenna system interface (ASI) which is a physical and logical control interface for the tilt actuator 607 and azimuth actuator 608 of the external portion 513 of the CPE 509. In one implementation, this interface uses a signaling protocol of the type know to those of ordinary skill in the control system arts to (i) provide data representing commands for actuation of the actuators to a desired position or state (depending on whether electro-mechanical or electronic, as well as (ii) data indicative of actual position of the affected antenna element(s) so as to determine actual versus commanded position (e.g., from a position sensor, limit switch, or other such mechanism of the antenna array apparatus 521). This interface can advantageously be implemented using comparatively low complexity and bandwidth technologies and protocols due to its low overhead; "feedback" for the closed-loop control system (FIG. 6) is obtained via the performance monitoring process (e.g., iPerf 517) or via analysis of RF data, each obtained via the RF front end 601 by the baseband processor 693 of the CPE 509, thereby obviating any high-bandwidth data flow over the ASI.

Figure 8A:
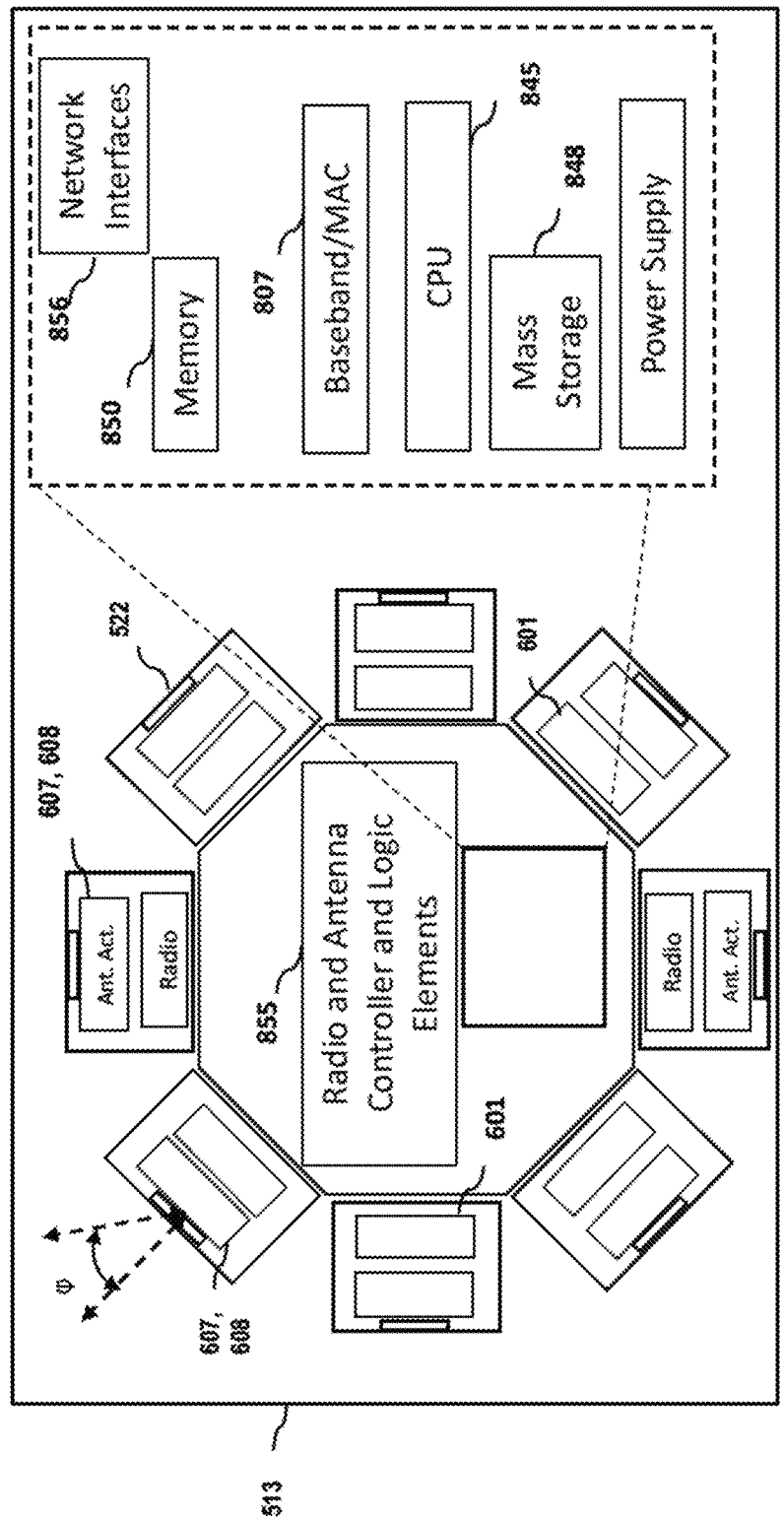
FIG. 8A is a functional block diagram illustrating another embodiment of an exemplary CPE/FWA apparatus with FPGA-based configurable logic blocks (CLBs) and antenna adjustment capability, according to the present disclosure.

Also shown in the embodiment of FIG. 8A is a network-based process (OSS 802) which, as described elsewhere herein, is in logical communication with the CPE/FWA 509 in order to support network-assisted radio path evaluation and control of the antenna element(s) of each of a plurality of CPE 509 under its cognizance. While shown as part of the EPC/5GC, the network OSS may be included within an MSO headend or other node, including within a 5G gNB CU. The OSS 802 may also be logically distributed in nature, such as where the OSS control functions of multiple RAN under control of the MSO or other operator are logically communicative with one another so as to optimize operation of the broader network operator infrastructure, such as load balancing, re-routing of service in the event of equipment failure, maintenance outages, natural disasters, etc. For instance, one RAN experiencing a blackout or other loss of service may have its served customers that are within range of another RAN (not shown) switch over to that second RAN based on control data resident within those CPE/FWA or transmitted to the CPE by the secondary RAN's OSS.

FIG. 8A illustrates an alternate embodiment of the external portion 513 of the CPE/FWA apparatus 509 of the disclosure, wherein an array of individual radio front end elements 601 and associated actuators 607, 608 support each of a plurality of antenna elements 522, the latter which are adjustable in azimuth and elevation by the respective actuators. This embodiment utilizes a plurality of configurable logic blocks (CLBs) 855 in support of the RF and iPerf measurements needed for the control system, and the control system logic 520 itself may be supported within one or more CLBs of the FPGA. Exemplary implementation details for the embodiment of FIG. 8A are described in co-pending U.S. patent application Ser. No. 16/741,509 filed Jan. 13, 2020 and entitled "METHODS AND APPARATUS FOR RADIO CONFIGURATION IN A WIRELESS SYSTEM," previously incorporated herein by reference in its entirety.

Methods—

Figure 9:
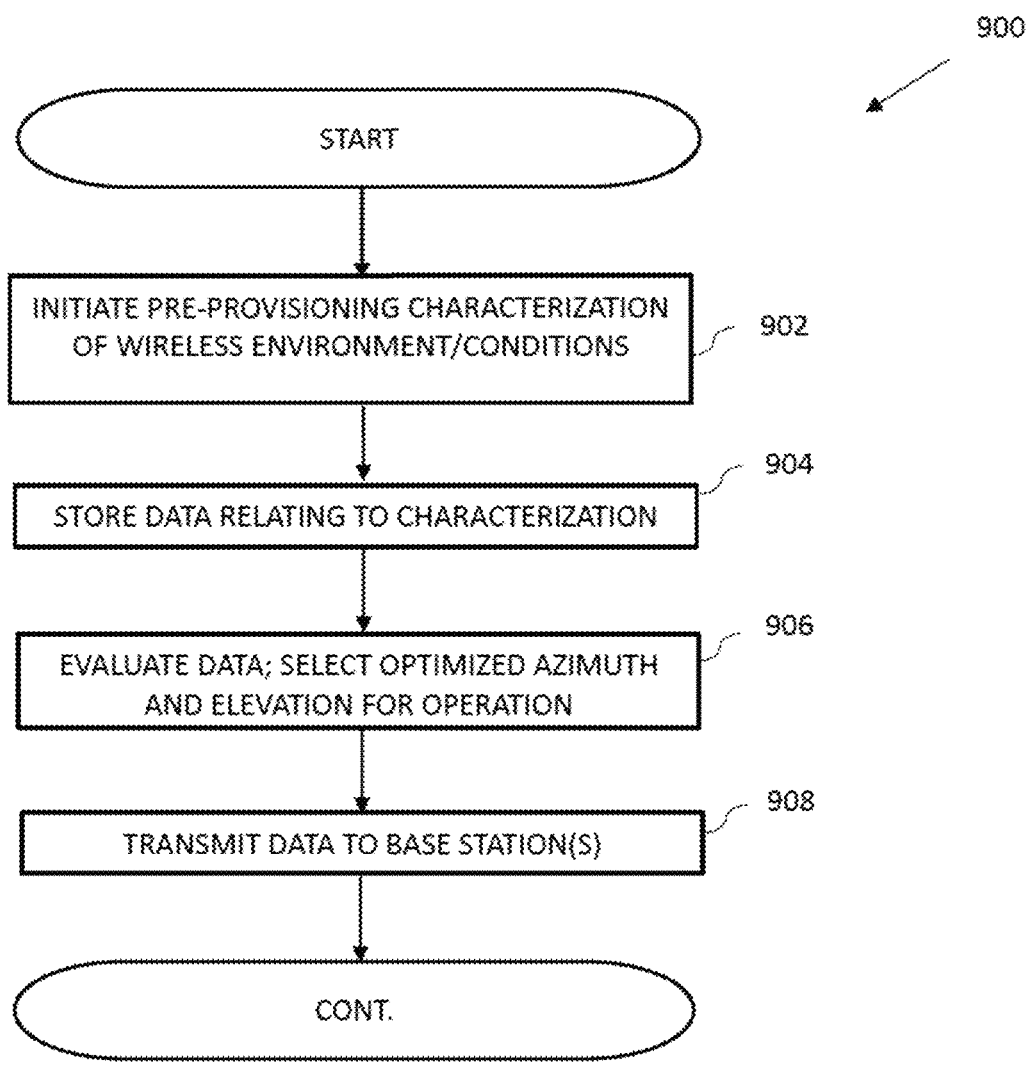
FIG. 9 is a logical flow diagram of an exemplary embodiment of a method for pre-provisioning a CPE/FWA antenna apparatus according to the present disclosure.

Referring now to FIG. 9, one embodiment of a method for pre-provisioning a CPE/FWA antenna apparatus according to the present disclosure is shown and described. Per step 902 of the method 900, pre-provisioning characterization of the wireless environment or conditions for a given target CPE/FWA 509 is initiated. For instance, during installation of the CPE/FWA at a premises, the installer or a remote entity (e.g., OSS 802) may invoke the CPE/FWA to conduct RF spectrum analysis and parameter scans. To the degree that one or more base stations (e.g., CBSDs) are active and can be connected to by the CPE 509, such connections may also be utilized for gathering link performance data such as via the iPerf module 517 as previously described. In one variant, this initial characterization may include iteratively repositioning each antenna element 522 of the array 521 at a prescribed azimuth and tilt value specified by a training or characterization plan stored as data within the CPE memory, such that a series of desired measurements are taken for each position. As such, the CPE 509 can generate a "heat map" of sorts for the parameters in question, such as SINR, RSSI, RSRP, throughput, latency, jitter, etc. (depending whether or not a data connection has been established). Moreover, this heat map can be used to evaluate sensitivity for different position adjustment (or other changes, such as MCS, carrier band, FEC type, spatial diversity settings, etc.); e.g., how sensitive the channel quality and performance is to movement of say 1 degree in azimuth for a given element 522. Note that while the elements of the array 521 are spatially co-located (each within a foot or two of each other on the rooftop/façade), they may have significantly differing properties due to e.g., azimuth, multipath propagation, presence of nearby components of the building, etc.

It will also be appreciated that the foregoing characterization may be conducted with different ones of the antenna elements 522 in different positions relative to a "DUT" element. That is, the performance of antenna element n in the same azimuth and elevation positions may differ depending on the orientation of other elements 522 of the same array, and as such a complete set of data wherein all possible combinations of all element positions would ideally identify cases where mutual interference or other phenomena existing between two or more antenna elements are present. This also includes aggregated subsets of the antenna elements 522, such as where a pair of antenna elements used for a common spatial diversity configuration (2×MIMO) are jointly evaluated as a set, either holding all other elements constant, or conversely holding the evaluated subset constant and varying one or more others of the array or elements 522.

However, it will be appreciated that depending on the number of antenna elements, the increments of adjustment for elevation and azimuth, the carrier frequencies tested, the beam dispersion, and other such factors, it may be unduly burdensome to perform such a complete characterization. As such, the present disclosure contemplates use of an abbreviated or lower-complexity characterization plan for use on (at least) pre-provisioning, which has been "intelligently" constructed based on tenable assumptions regarding the performance of each antenna element, including MATLAB simulations or similar channel and antenna performance models. As one simple example, if a narrow beam dispersion for each antenna element exists (whether by physical design or selection of one or more operating parameters), then cycling each individual element 522 through its entire range of azimuth may be unnecessary, especially where such beam dispersion has been considered as part of the initial design of the array 521. Likewise, if certain carrier frequencies are unlikely to be utilized during any operation of the array (e.g., are precluded from use, such as by a SAS), then characterization of the array at those frequencies may be obviated.

Figure 4:
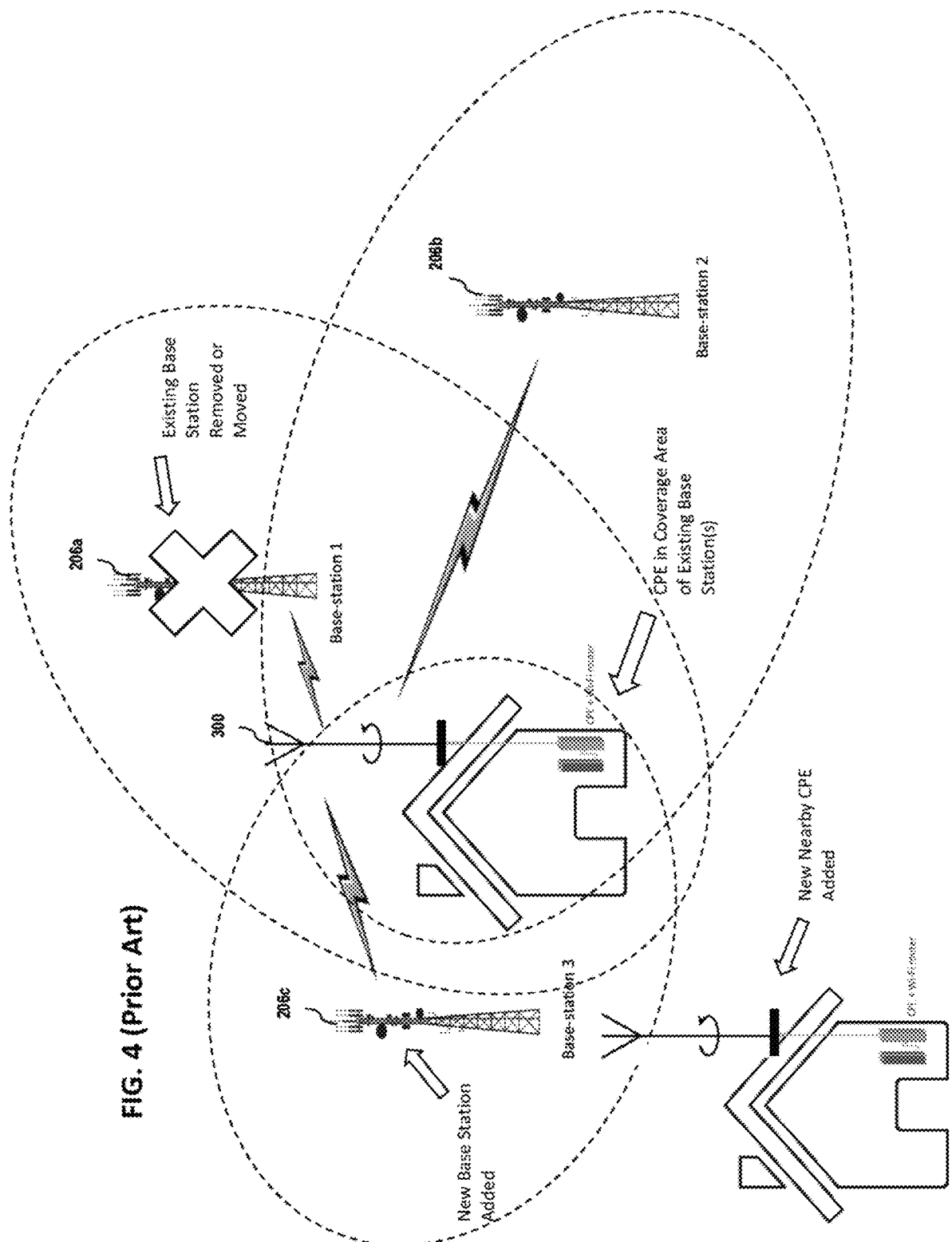
FIG. 4 is a graphical illustration of a prior art wireless network, showing various changes or conditions that may occur such as addition of a new base station, movement or removal of an existing base station, or placement of CPE/FWA apparatus for a premises at the edge of a coverage area or cell of the wireless network.

The training plan referenced above may also be constructed based on known CBSD/xNB locations relative to the premises. For instance, where two CBSDs 206 are known to exist at azimuths corresponding to 0-degrees and 150-degrees relative to the CPE 509, respectively, then those two azimuths can be selected as the initial (or even sole) bases of characterization; e.g., the training plan may iterate around those azimuth values, yet ignore others where no CBSDs are expected to exist. It will be appreciated, however, that in some cases, CBSDs may be added or removed (see FIG. 4), and hence the training plan for a given CPE might periodically undergo "update" searches, especially when changes in CBSD installations and other nearby CPE have occurred.

Returning to FIG. 9, per step 904, the obtained data from step 902 is stored, such as within the local database of the CPE/FWA 509 (see FIG. 8), and/or at a network storage location such as one associated with or designated by the OSS 802.

Per step 906, the data is evaluated, and an optimized antenna configuration identified. For example, in one approach, the data is evaluated locally by logic on the CPE itself (e.g., within the iPerf tracker module 605 or RPC logic 866), and a putative initial setting for azimuth and elevation for each controlled element 522 identified based on e.g., algorithmic analysis of the aforementioned heat map data (e.g., by looking for local maxima within one or more parameters such as iPerf throughput, and correlating that maxima to the azimuth/elevation settings when the data was obtained).

Per step 908, the data (including the raw stored data, and optionally the evaluated data from step 906) is transmitted to the connected base station, whether while the characterization is ongoing (e.g., "streaming" data as it is generated), or at some later time, including after the characterization is completed. This data may be used by the recipient base station (e.g., such as by a CU of a gNB), and/or passed towards the EPC/5GC or MSO headend for use by e.g., the OSS 802.

Figure 9A:
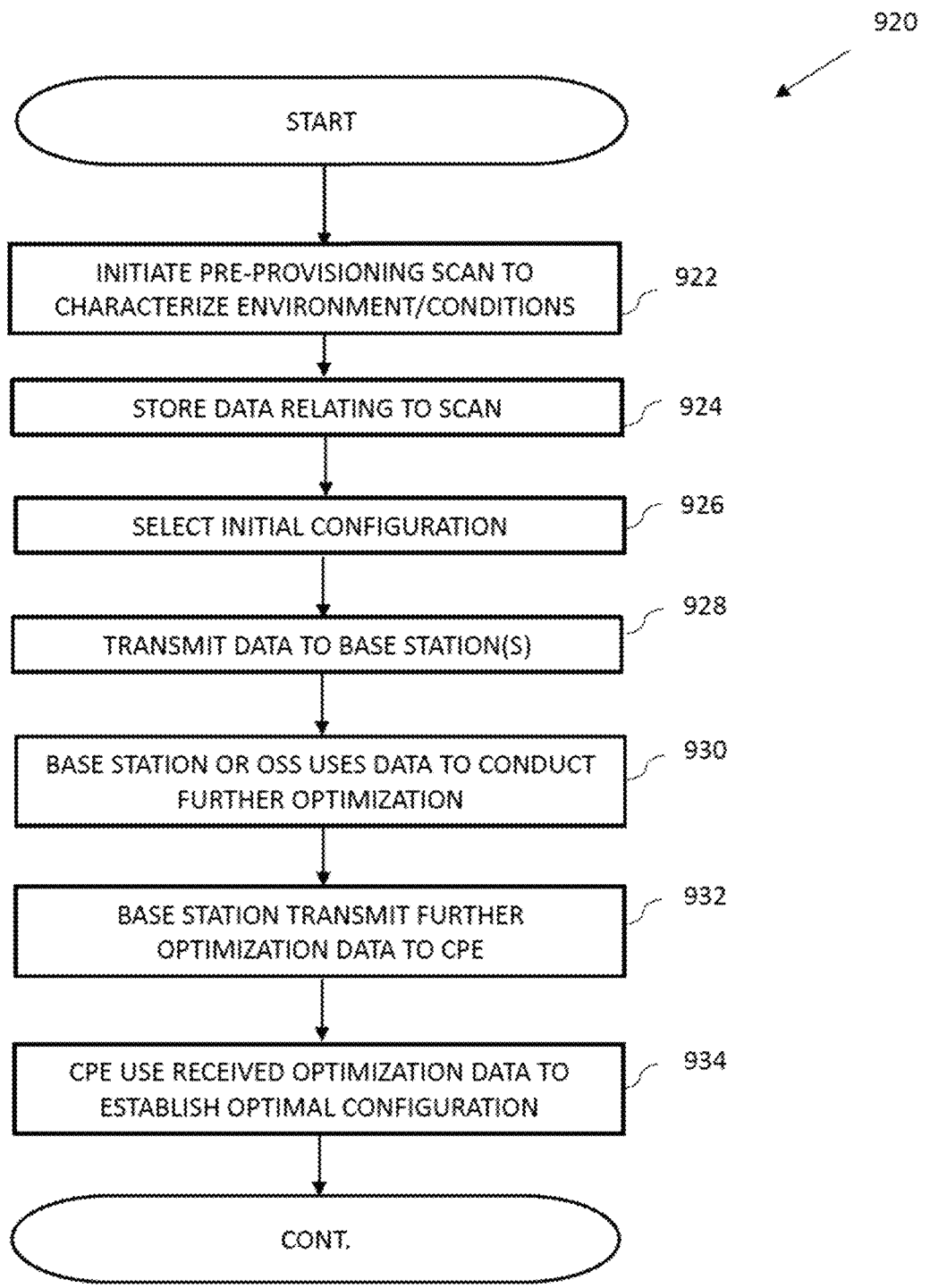
FIG. 9A is a logical flow diagram of an exemplary implementation of the method for pre-provisioning of FIG. 9, wherein network assistance is utilized.

FIG. 9A is a logical flow diagram of an exemplary implementation of the method for pre-provisioning of FIG. 9, wherein network assistance is utilized. As shown, step 922 of the method 920 includes characterization of the CPE/FWA environment as in the method 900 of FIG. 9). Gathered data is stored per step 924, and an initial antenna array configuration selected per step 926. This initial selection may be e.g., a coarse first estimate based on e.g., completion of a partial training plan or characterization, so as to enable reduced latency in getting the CPE/FWA 509 operational (albeit not fully optimized).

Per step 928, the data is transmitted to the base station(s) connected to the CPE and ultimately the OSS 802, where further optimization is conducted per step 930. For example, in one variant, the BS/OSS may take the data transmitted from the CPE 509 (which represents for instance a partial or limited scope characterization, and/or limited scope data set derived from the characterization), and in effect "picks up" where the CPE 509 evaluation left off by conducting more detailed algorithmic analysis, including in light of other data it may possess relating to e.g., other CPE which could impact the instant CPE/FWA 509 during operation. Alternatively, the OSS or BS may obtain a complete data set from the CPE 509, such as in the case where the CPE conducted a full (or comprehensive) data collection, but merely did not perform (or lacks capability to perform) the request degree of analysis in order to generate a meaningful optimization, including by lack of visibility into other nearby CPE data, or lack of sufficient processing capability/algorithms.

Per step 932, the OSS/BS transmits further optimization-related data (which may be in the form of additional raw data which the CPE itself can utilize for further optimization/refinement, or alternatively fully processed or "end-result" data such as parameters or even commands to be used by the CPE controller logic 520 in repositioning all or portions of the array 521, selecting proper parameters, or other aspects). The received data is then used by the CPE 509 to implement the optimized configuration as determined by the network assistance of the BS or OSS 802.

Figure 10:
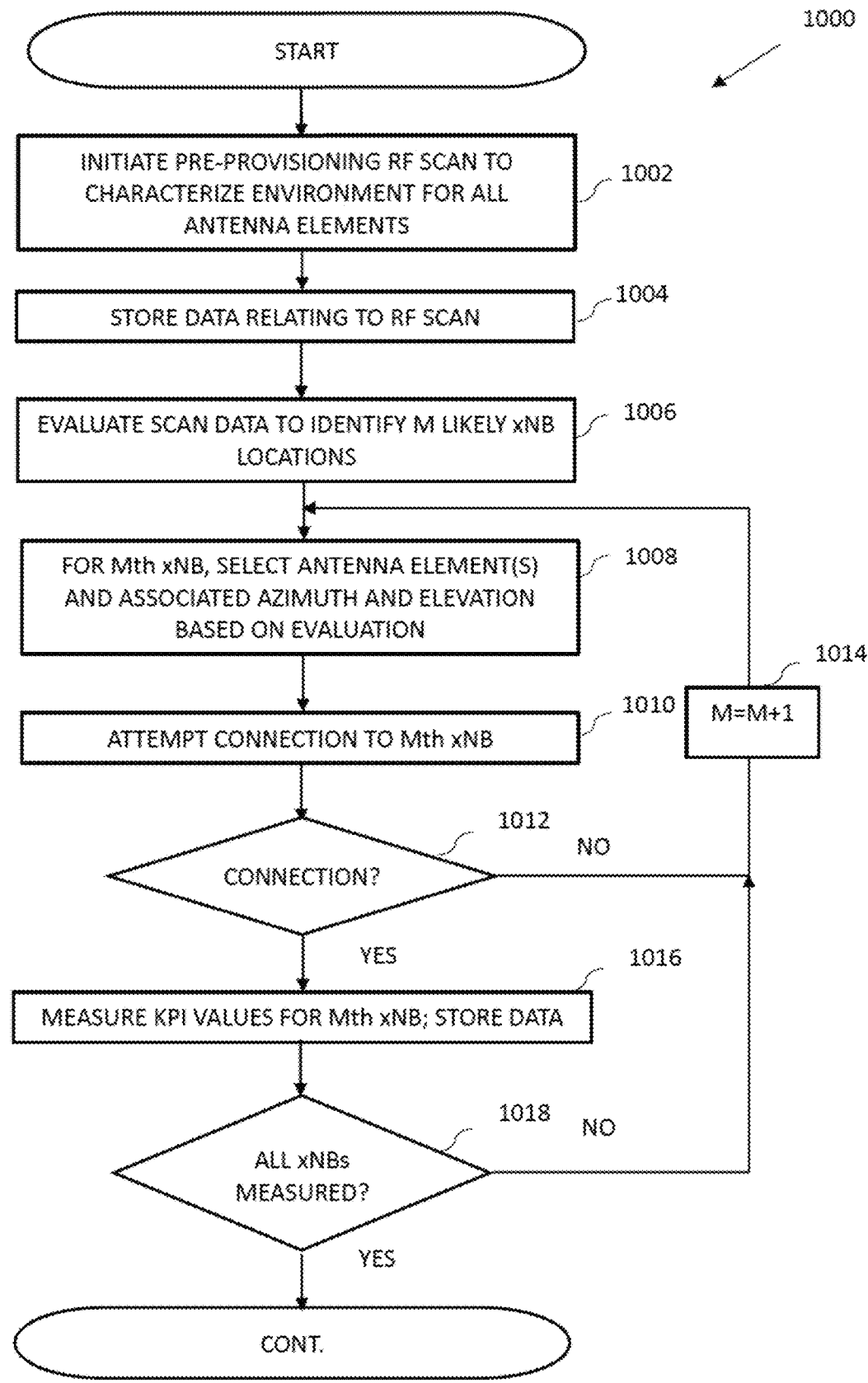
FIG. 10 is a logical flow diagram of another exemplary embodiment of a method for pre-provisioning a CPE/FWA antenna apparatus according to the present disclosure, wherein multiple base stations are available to the CPE/FWA.

FIG. 10 is a logical flow diagram of another exemplary embodiment of a method for pre-provisioning a CPE/FWA antenna apparatus according to the present disclosure, wherein multiple base stations are available to the CPE/FWA. In this embodiment, the CPE/FWA 509 has no a priori knowledge of base stations in its area.

Per step 1002 of the method 1000, a characterization of the environment of the CPE 509 is conducted, including at least some measurements taken from all of the available antenna elements 522 of the CPE array 521, whether contemporaneously or individually (or in subsets). Since the CPE has no knowledge of CBSDs/xNBs nearby, it must first gather sufficient data to identify or localize putative azimuths and elevations which may be associated with serving CBSDs/xNBs.

The obtained data is stored per step 1004, and evaluated per step 1006 to identify M likely base stations in terms of azimuth and elevation. This may be conducted for instance by evaluating RF spectrum data such as peaks or local maxima within the gathered heat map data. For example, a local maximum in antenna gain, RSSI or SINR at 30 degrees relative azimuth would be considered a possible xNB location.

Per step 1008, for each (M) identified base stations of step 1006, one or more antenna elements 522 of the array are correlated to the base station. For instance, one simple approach is to correlate the element with highest SINR or RSSI (or two highest elements) with a given base station. More sophisticated approaches may be used as well.

Next, per step 1010, the CPE 509 attempts to establish a connection with each of the M base stations, such as according to 3GPP protocols to establish RRC_Connected status. If connection occurs per step 1012, then per step 1016, connection-enabled parameter data (such as throughput, latency, jitter, etc.) is obtained and stored for the connected xNB, and the process iterates per step 1018 to increment the counter for M (step 1014) and perform steps 1008 and subsequent for the next xNB detected (if any). If a connection cannot be established, this data is logged and the counter is incremented per step 1014.

Figure 11:
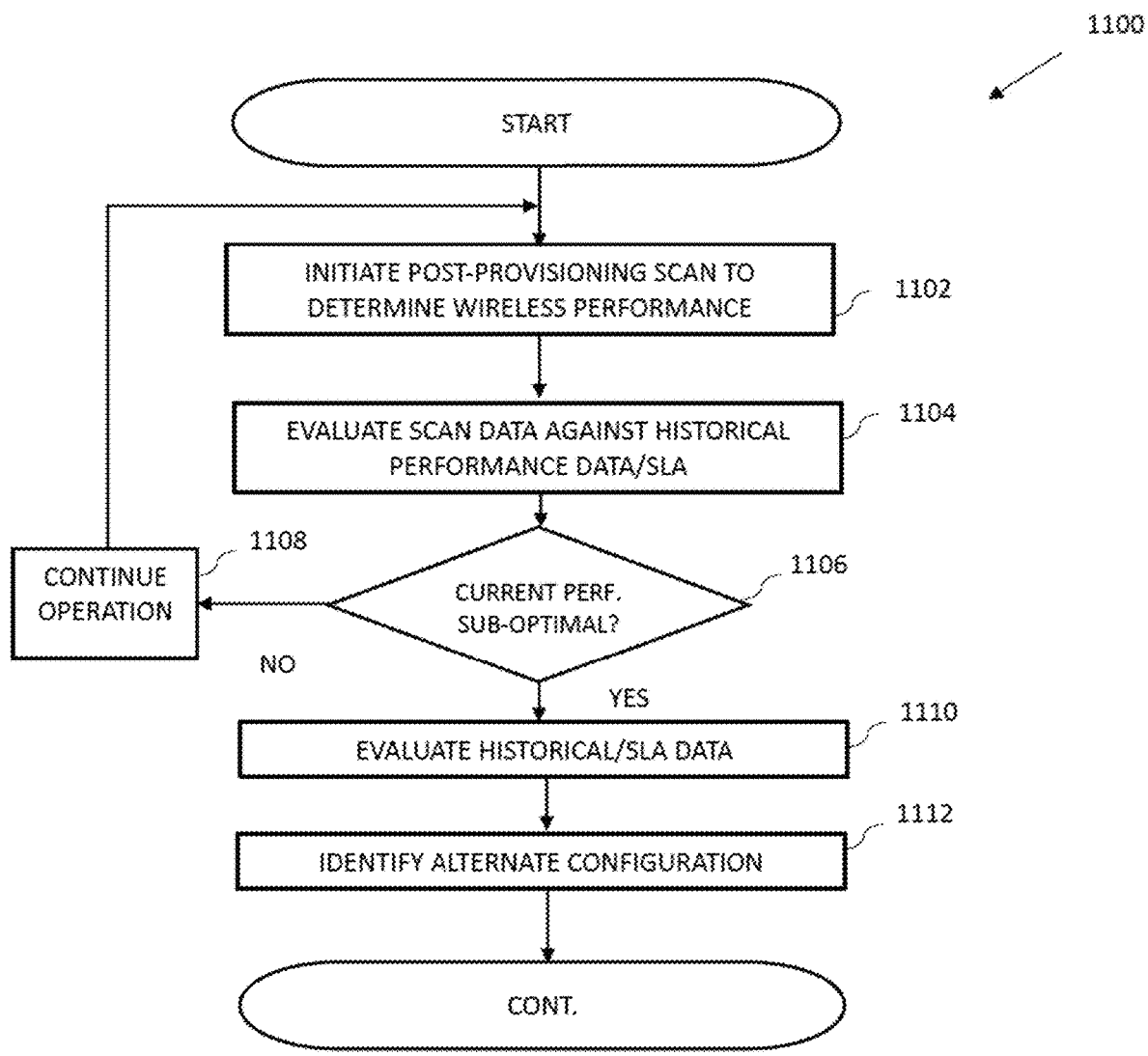
FIG. 11 is a logical flow diagram of an exemplary embodiment of a method for post-provisioning a CPE/FWA antenna apparatus according to the present disclosure.

FIG. 11 is a logical flow diagram of an exemplary embodiment of a method for post-provisioning a CPE/FWA antenna apparatus according to the present disclosure. In this method 1100, the CPE/FWA 509 has already been installed and is operational (in contrast with pre-provisioning discussed above).

Per step 1102, a post-provisioning scan is initiated for the target CPE/FWA 509 to assess its wireless performance. This step may be initiated according to a prescribed periodicity, a schedule, upon one or more parameters falling below prescribed threshold values, upon instigation by a network process (e.g., based on an OSS-issued commend), or even by the customer themselves, such as via a diagnostic menu which the customer may follow when they perceive that their service is in some aspect deficient. For instance, in on variant, data rate/throughput is assessed via the installed iPerf process 517 of the CPE based on e.g., test data transmitted to/from the CPE as measured by the iPerf process.

Per step 1104, the scan data is evaluated against a prescribed criterions, such as historical data (e.g., has performance degraded significantly as compared to one or more historical periods for the same CPE?), and/or prevailing SLA requirements (if applicable), such as for UL/DL data rates.

Per step 1106, if the assessed performance is not sub-optimal, operation continues per step 1108. Conversely, if performance is deemed sub-optimal (e.g., below SLA, or even if above SLA, on a downward trajectory or otherwise less that what would be deemed "normal" for that particular installation based on historicals), then the historical/stored data for that CPE/FWA 509 is then evaluated in greater detail per step 1110 to attempt to identify one or more other configuration options which may enhance performance. Such options may include for instance: (i) selection of a different azimuth/tilt configuration for one or more antenna elements 522 of the array which may enhance the signal form the same base station; (ii) selection of additional spatial diversity, MCS, or other configurations which may enhance performance; (iii) selection of different ones of the antenna array elements 522 which may enhance connectivity with the same (existing base station); (iv) selection of different antenna elements and/or azimuth and tilt values which may enable connection to a higher SINR base station available to the CPE 509; and/or (v) selection of one or more supplementing CPE/FWA apparatus available to the instant apparatus 509 from which additional capacity can be obtained.

Figure 11A:
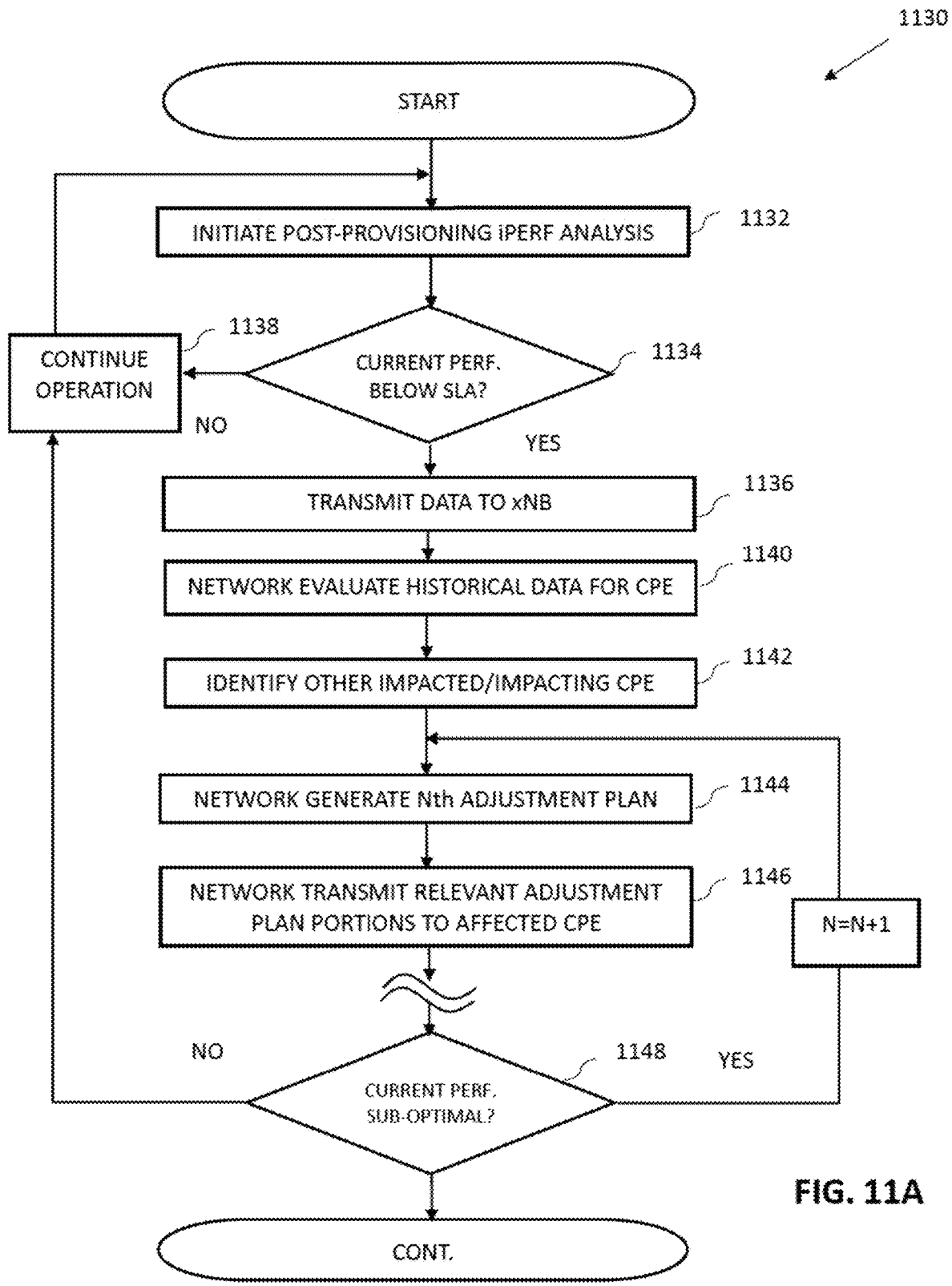
FIG. 11A is a logical flow diagram of an exemplary implementation of the method for post-provisioning of FIG. 11, wherein network assistance (including evaluation of impacts on other CPE) is utilized.

FIG. 11A is a logical flow diagram of an exemplary implementation of the method for post-provisioning of FIG. 11, wherein network assistance (including evaluation of impacts on other CPE) is utilized. In this method 1130, the CPE/FWA 509 first initiates post-provisioning performance analysis on its connection(s) per step 1132. If per step 1134 the current performance level is not sub-optimal, operation continues per step 1138. If performance is sub-optimal, however, then the gathered performance data from step 1132 (and any other ancillary data which may have been collected by the CPE previously, such as SRS/CRS data, RF spectrum scan data, etc.) is transmitted to the connected xNB per step 1136, and the cognizant network process (e.g., OSS 802) utilizes the transmitted data for the target CPE 509 further evaluation per step 1140.

Per step 1142, other potentially impacted CPE/FWA devices are identified; for instance, those within a prescribed radius or geographical proximity, those within LOS between the CPE and a base station, etc. are identified. This identification may be through access to an extant database maintained by the network operator (e.g., MSO), or alternatively may be derived through analysis of actual scan/throughput data obtained from the target CPE (and others), such as upon a request from the OSS 802 issued to each CPE.

Per step 1144, the network (e.g., OSS) generates an adjustment plan, which may include adjustment of one or more configurations of the target CPE/FWA 509, as well as those identified per step 1142 as potentially being impacted by (or impacting) the target CPE/FWA adjustments. As a simple example, two adjacent CPE within a neighborhood may be so close that each generates interference for the other when operating and connected to a prescribed base station (even with extant mechanisms for interference reduction and multiple access such as spatial diversity, time-frequency resource allocation diversity, etc., since they physically occupy a very narrow azimuth as seen by the serving BS). As such, one of the CPE may simply be reconfigured to select an alternate base station at a different relative azimuth (and possibly different elevation), thereby alleviating the problem. Based on pre-provisioning scan data as described previously herein, the reconfiguration of the selected CPE by the OSS can be performed almost seamlessly, since the CPE being reconfigured already has characterized its environment including other possible CBSDs/xNBs, thereby obviating a service technician from coming out and manually re-adjusting the CPE configuration.

Per step 1146, the relevant portions of the adjustment plan from step 1144 are transmitted to the affected CPE/FWA device(s), and after implementation thereof, performance is again measured per step 1148. If satisfactory, operation continues per step 1138. If sub-optimal, then a counter (N) is incremented, and the process returns to step 1144, wherein a new iteration or increment of the adjustment plan is generated by the OSS 802 or proxy node, including based on the data obtained from step 1148 (e.g., whether there was any noted improvement or degradation after the first adjustment was entered, or other parameter changes of interest in developing the (updated) adjustment plan.

It will be readily apparent from the foregoing that development and implementation of such adjustment plans may be carried out incrementally or iteratively across all or a subset of a population of CPE/FWA under control of a given OSS. For example, one model used by the OSS logic may "perturb" one CPE/FWA within the population, and then obtain data from others to assess the impact, with subsequent perturbations being applied based on the assessed impact. Alternatively, the entire plan may be developed at once (e.g., based on available data and modeling), implemented en masse, and the results evaluated based on performance data from various of the affected CPE. Generally speaking, an incremental approach is preferred in most scenarios, since the likelihood of significant degradation to one or more customers' service quality is minimal through only small/limited changes to a given CPE.

Figure 12:
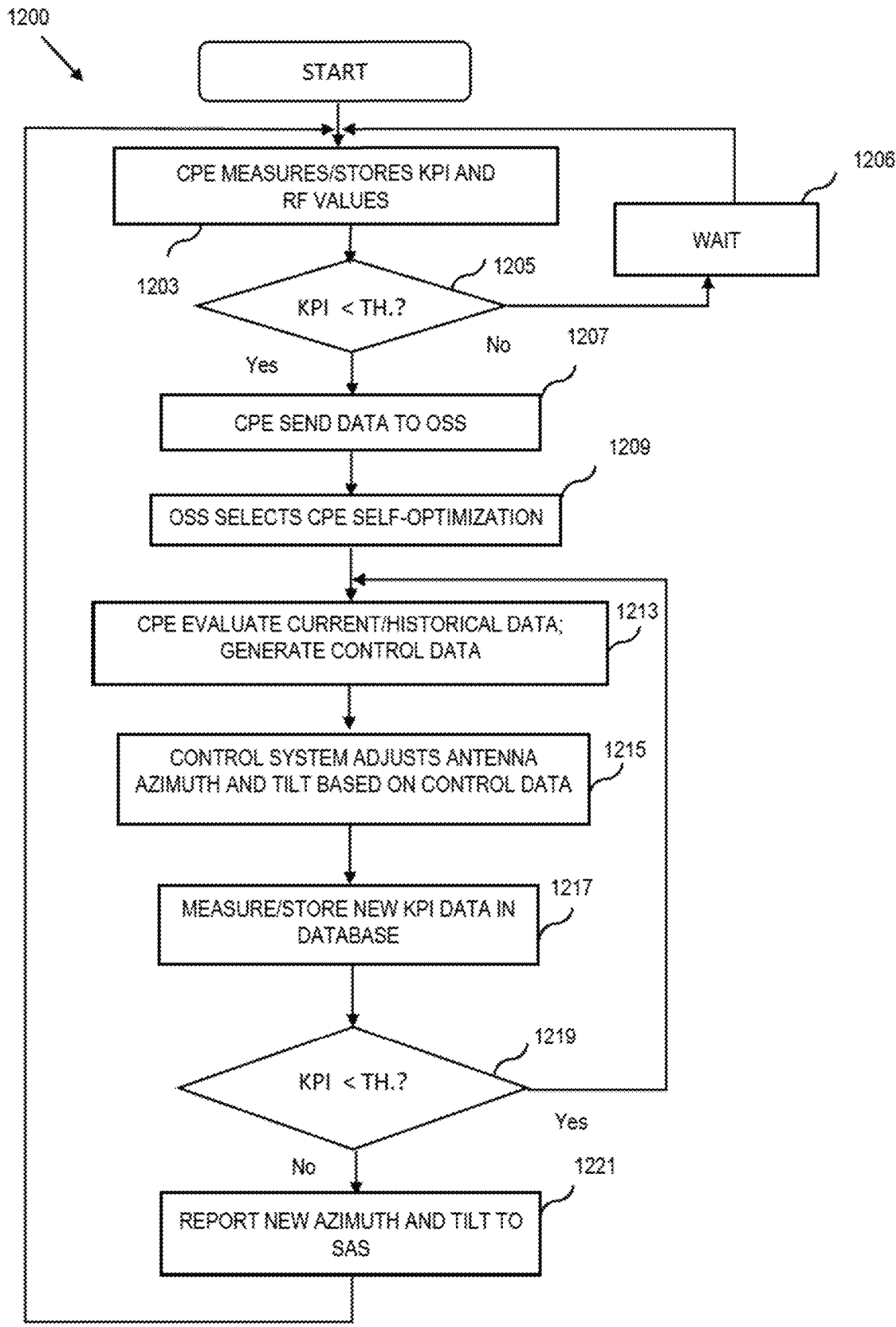
FIG. 12 is a logical flow diagram of an exemplary embodiment of a method for post-provisioning a CPE/FWA antenna apparatus based on measured performance and RF data, according to the present disclosure.

FIG. 12 is a logical flow diagram of an exemplary embodiment of a method for post-provisioning a CPE/FWA antenna apparatus within a CBRS network with a SAS, CBSD/xNBs 206, network OSS 802, and CPE/FWA 509 as previously described.

At step 1203 of the method 1200, performance and RF data is measured by the CPE 509 e.g., via iPerf 517 which measures the KPIs (e.g., throughput, latency, jitter, error rates and various network performance related KPIs). Next, per step 1205, the iPerf process compares the KPI data with one or more thresholds, the thresholds which may be directed by the network and varied dynamically in some embodiments (e.g., to various values above the minimum prevailing SLA for the CPE) 509. If the measured KPI data indicated performance greater than the prescribed threshold, the required system performance is met, and the KPIs are stored in the data base and a wait state is entered (step 1206). If the measured KPI data indicates performance less than the threshold(s), the method proceeds to step 1207, wherein the data is sent to the OSS 802, whereby at step 1209, the OSS selects self-optimization for the CPE in order to generate control data to adjust antenna azimuth and tilt.

Next, per step 1213, CPE evaluates the current and historical data (or subsets thereof) of its database to generate control data (via the controller 520). The results of the evaluation are sent from the KPI tracker process 605 to the control system module 520, which generates the control signals for adjusting antenna azimuth and tilt based on the data received from the KPI tracker. The antenna azimuth and tilt are adjusted by the actuators 607 and 608 per step 1215.

After the adjustment, new measured (performance and RF) data are stored in the data base, per step 1217.

Per step 1219, the new performance data is evaluated against then then prevailing threshold value(s), and if less, the process iterates to generate new control data based on a subsequent evaluation of the locally stored historical (and newly generated current) data by the CPE.

Finally, per step 1221, when the CPE 509 has converged on a suitable configuration (i.e., performance per step 1219 is satisfactory), the new azimuth and tilt are reported to the network via the connected CBSD/xNB (and ultimately the SAS), and the method proceeds again to step 1203 for further monitoring. As discussed above, the CBSD/xNB(s) may interface with the host SAS directly, or via one or more interposed entities such as computerized domain proxy (DP) entities 208. For the purposes of illustration, it will be assumed that each of the registering CBSD/xNB s is/are associated with a common network operator (NO) domain, although this is not a requirement for practicing the method 1200.

It will also be recognized that the level of reporting made to the network regarding antenna and/or radio configurations and changes thereto may be (i) varied in scope, and (ii) made on either a final or intermittent basis. For example, in the exemplary context of a CBRS network, the cognizant SAS may require certain data regarding the antenna configuration, such as transmit power, azimuth, elevation, etc. As such, the data set sent from the CPE 509 (or a network node further upstream, including for instance a 5G NR CU) may be tailored so as to provide the OSS and/or SAS with the requisite data alone, or include supplementary data which may not be required but which may assist the OSS (or SAS) in further analysis of the operating environment of the particular CPE. For instance, the OSS may utilize the collected iPerf data sent from the CPE 509, but strip such data off from reporting to the SAS. Alternatively, the CPE 509 or a proxy node therefore (such as the xNB CU) may report two different data sets; e.g., one to the SAS, and a different one to the OSS, the latter with additional data which is of use to the OSS in characterizing the particular environment of the CPE 509.

Moreover, while FIG. 12 illustrates one exemplary configuration where the final antenna configuration is reported to the network (and SAS), incremental position changes may also be reported upstream, especially for the OSS, for instance to provide a more comprehensive data set on antenna element/CPE response as a function of the inserted control commands or adjustments (as opposed to merely "start and finish" data).

Figure 12A:
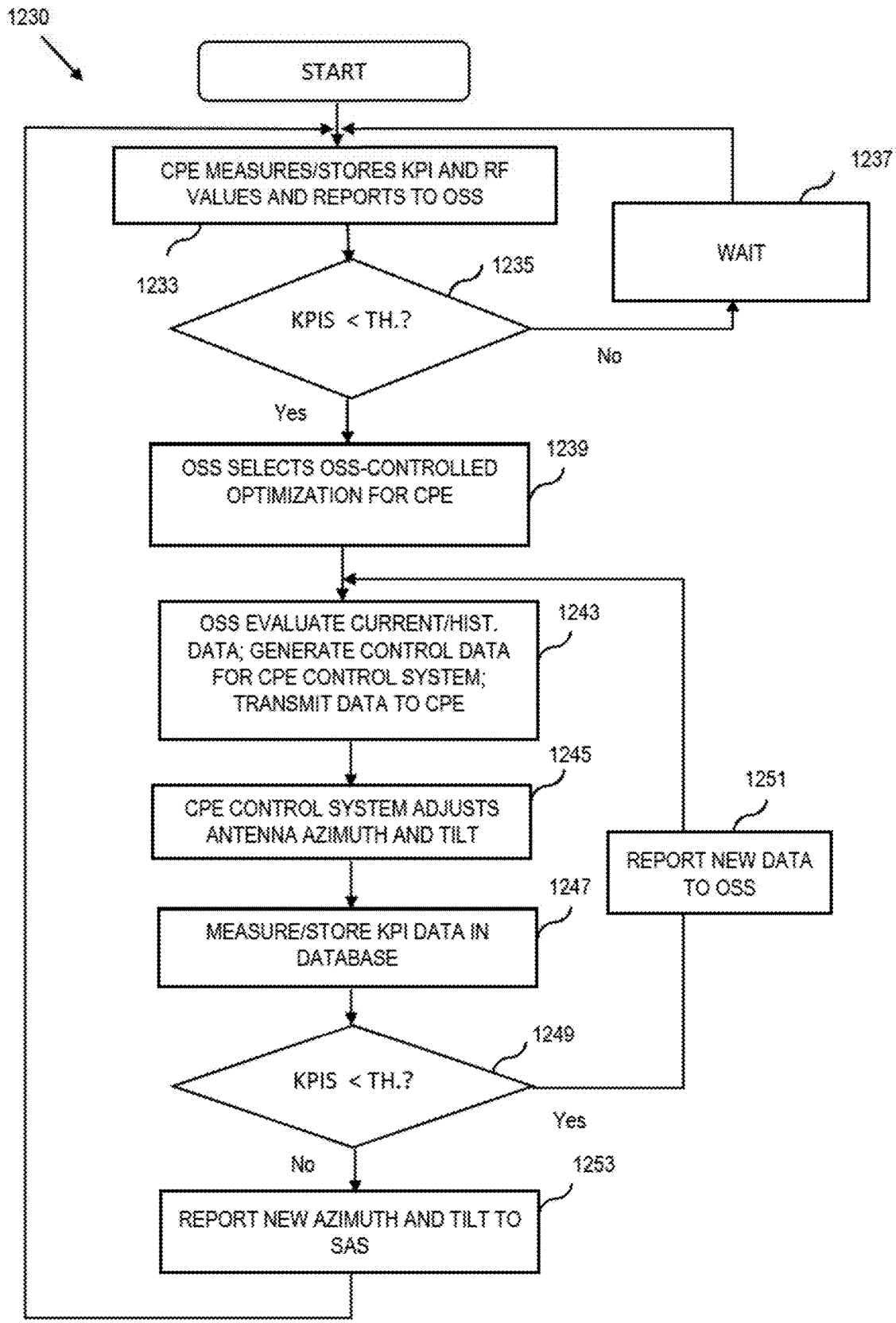
FIG. 12A is a logical flow diagram of an exemplary implementation of the method for post-provisioning of FIG. 12, wherein OSS assistance and updates are utilized.

FIG. 12A is a logical flow diagram of an exemplary implementation of the method for post-provisioning of FIG. 12, wherein OSS assistance and updates are utilized. In this variant, the CPE/FWA 509 logic is configured to default to OSS-assisted operation based on e.g., firmware configuration, prior mode selection by the network/OSS, lack of indigenous processing capability, etc. It will be appreciated, however, that the present disclosure contemplates CPE configurations and operating modes wherein both network-assisted and CPE/FWA local processing (such as in FIG. 12) are utilized, whether in tandem or sequentially. For instance, the CPE/FWA may be configured to make a first attempt at assessment/optimization, and where that effort falls short of the desired performance level, only then invoke the network-assisted approach.

At step 1233 of the method 1230 of FIG. 12A, performance and RF data is measured by the CPE 509 e.g., via iPerf 517 which measures the KPIs (e.g., throughput, latency, jitter, error rates and various network performance related KPIs). The obtained data is also reported to the OSS directly per step 1233.

Next, per step 1235, the iPerf process compares the KPI (or other) data with one or more thresholds, the thresholds which may be directed by the network and varied dynamically in some embodiments (e.g., to various values above the minimum prevailing SLA for the CPE) 509. If the measured KPI data indicated performance is greater than the prescribed threshold, the required system performance is met, and the KPIs are stored in the database and a wait state is entered (step 1237). If the measured KPI data indicates performance less than the threshold(s), the method proceeds to step 1239, wherein the data sent to the OSS 802 is used as a basis for OSS selection of network-assisted (OSS controlled) operation for the CPE in order to generate control data to adjust antenna azimuth and tilt. For instance, in one variant, the OSS may look at the level of deficiency of the performance/RF data, and determine therefrom that the particular CPE 509 requires a greater degree of intervention than can be provided through CPE-based (local) assessment and adjustment alone, including cases where other CPE proximate to the target CPE 509 must also be contemporaneously adjusted in order to achieve the desired performance/SLA.

Next, per step 1243, CPE evaluates the current and historical data (or subsets thereof) of its database to generate control data for transmission to the CPE. The results of the evaluation are sent from the OSS 802 via the connected base station (or other communication channel) to the CPE control system module 520, which generates the control signals for adjusting antenna azimuth and tilt based on the data received. The antenna azimuth and tilt are adjusted by the actuators 607 and 608 per step 1245. The control data/ position updates are also recorded locally by the system so as to maintain cognizance of the adjustments that the OSS has made, such as for use when the CPE returns to "autonomous" or locally-controlled operation.

After the adjustment, new measured (performance and RF) data are stored in the database, per step 1247.

Per step 1249, the new performance data is evaluated against then then prevailing threshold value(s). In one variant, this comparison is performed locally by the indigenous iPerf or similar process executing on the CPE. If less than the desired values, the process iterates to transmit the newly generated performance/RF data to the OSS, the latter which will then generate new control data based on a subsequent evaluation of the previously forwarded historical (and newly generated current) data by the CPE.

In another variant (not shown), the data measured and (locally) stored per step 1247 is also sent to the OSS directly, wherein the evaluation of step 1249 is conducted by the OSS (versus the CPE KPI tracker or other local process).

Finally, per step 12532, when the OSS (and CPE) has converged on a suitable configuration (i.e., performance per step 1249 is satisfactory), the new azimuth and tilt are reported to the SAS.

Figure 13:
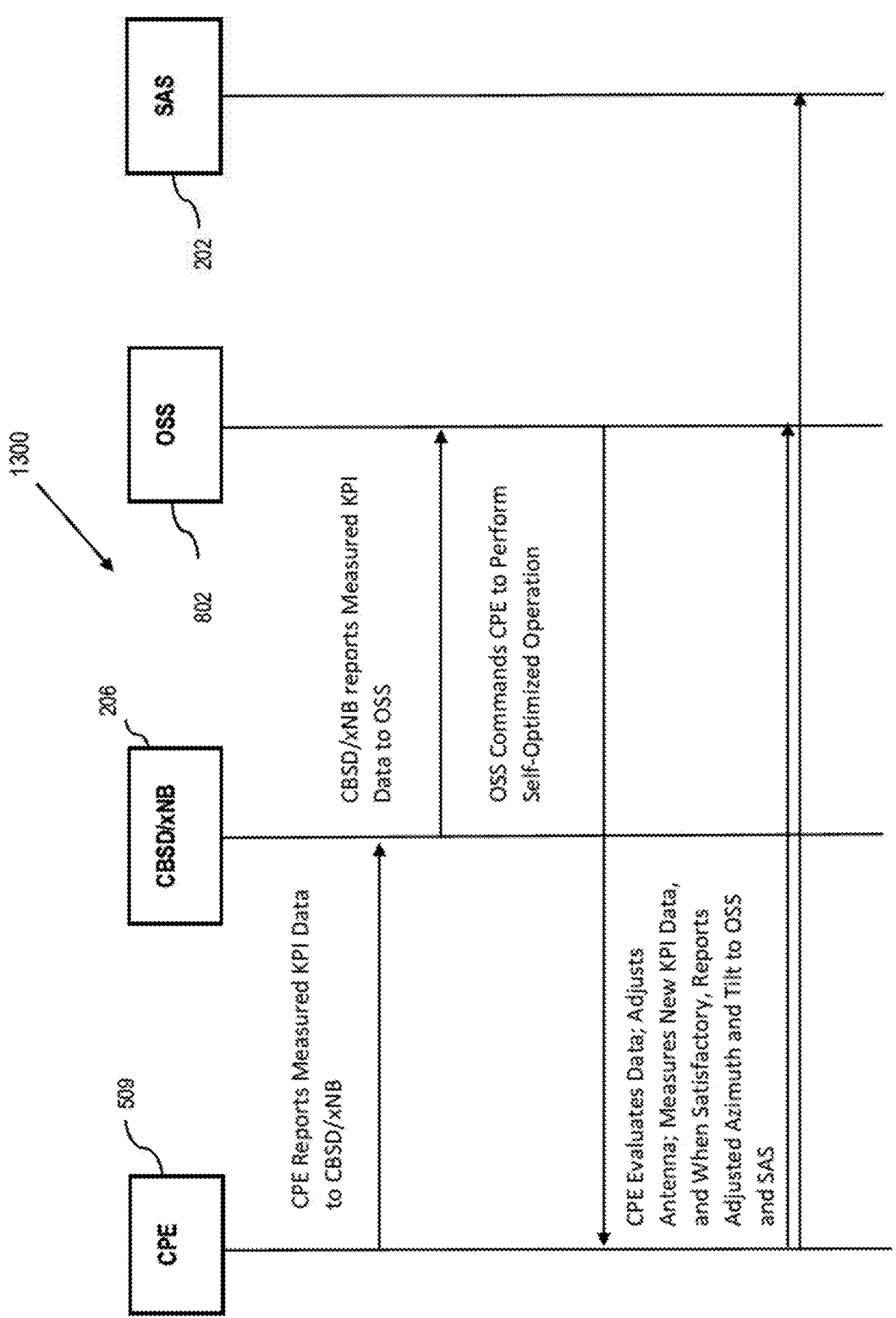
FIG. 13 is a ladder diagram illustrating exemplary communication flow between CPE/FWA, CBSD/xNB, OSS and SAS according to one embodiment of the post-provisioning methodology of the present disclosure.

FIG. 13 is a ladder diagram illustrating exemplary communication flow between CPE/FWA, CBSD/xNB, OSS and SAS according to one embodiment of the post-provisioning methodology of the present disclosure. As shown, this flow 1300 corresponds generally to the methodology 1200 of FIG. 12 (i.e., self-optimization by the CPE/FWA 509).

Figure 14:
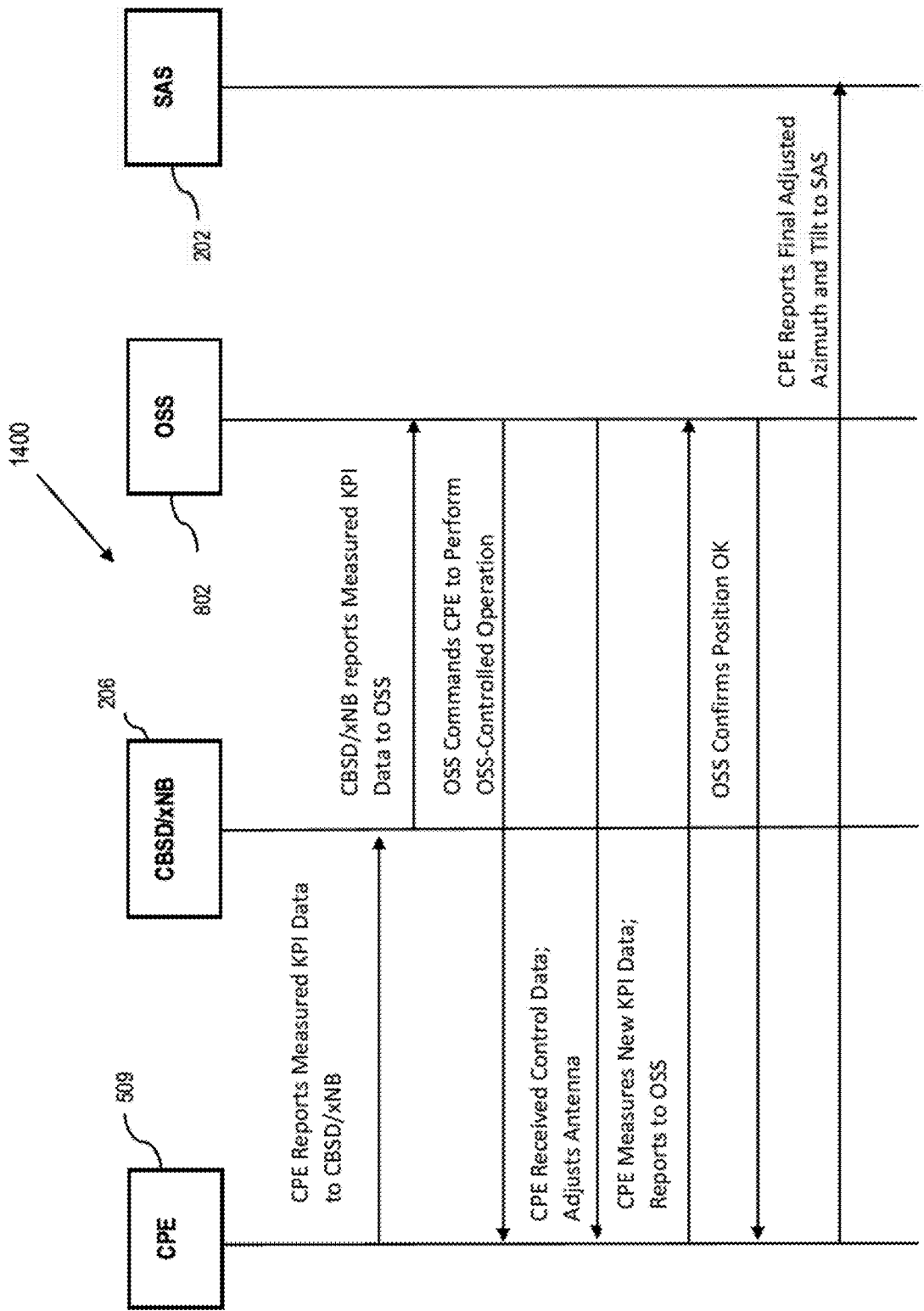
FIG. 14 is a ladder diagram illustrating exemplary communication flow between CPE/FWA, CBSD/xNB, OSS and SAS according to another embodiment of the post-provisioning methodology of the present disclosure.

FIG. 14 is a ladder diagram illustrating exemplary communication flow between CPE/FWA, CBSD/xNB, OSS and SAS according to another embodiment of the post-provisioning methodology of the present disclosure. As shown, this flow 1400 corresponds generally to the methodology 1230 of FIG. 12A (i.e., network-assisted optimization of the CPE/FWA 509 by the OSS).

FIGS. 15A-15D are functional block diagrams illustrating various spatial diversity use cases/configurations according to some embodiments of the present disclosure.

As shown, the present disclosure contemplates a variety of different CBSD/xNB 206, beam, and propagation path (i.e., direct/indirect multipath) combinations by which a given CPE/FWA 509 can transact multiple signals with one or more of the service CBSDs/xNBs 206, only a few of which are illustrated, but all of which will be appreciated by one of ordinary skill given the present disclosure.

Figure 15A:
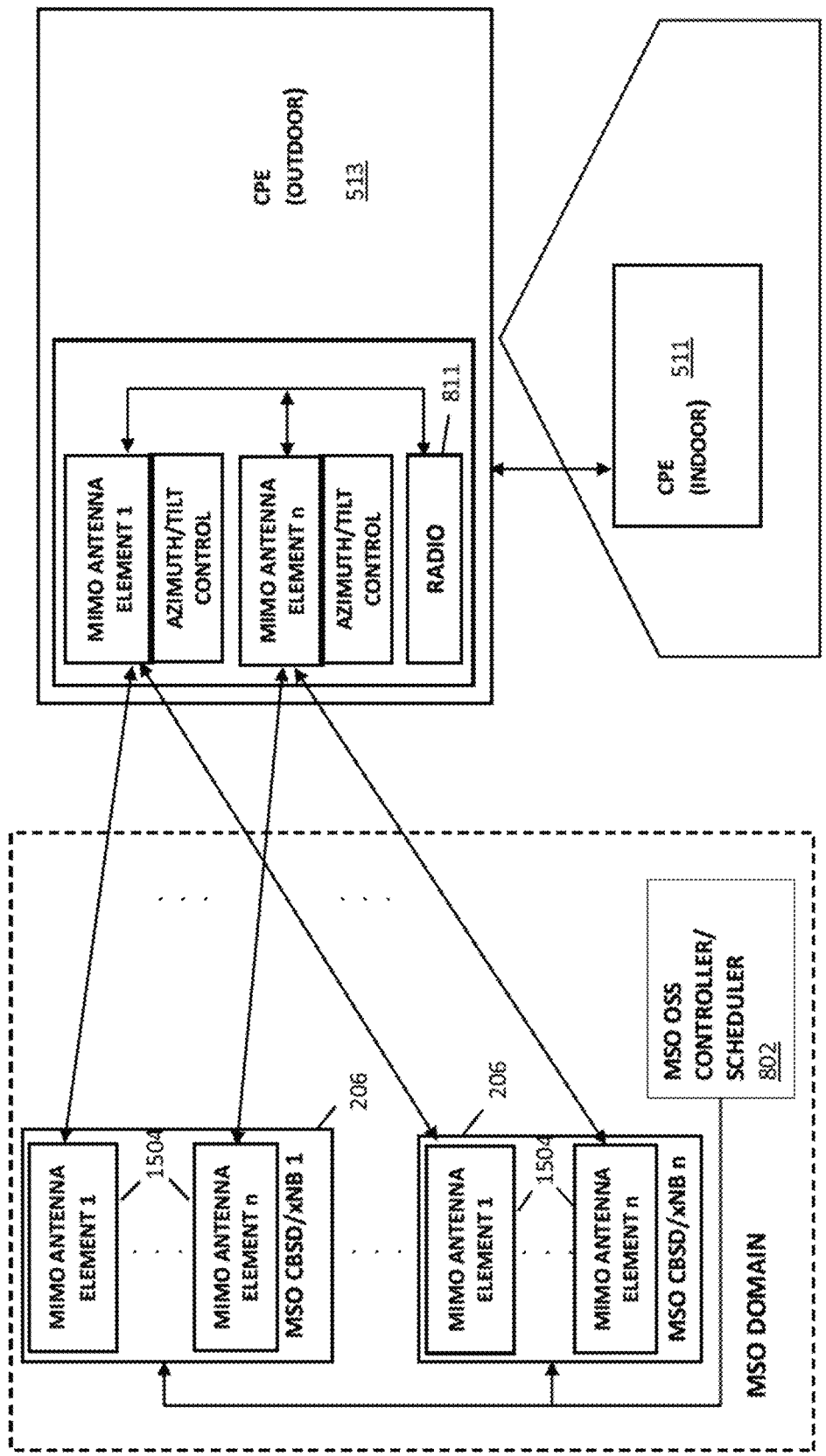
FIGS. 15A-15D are functional block diagrams illustrating various spatial diversity use cases/configurations according to some embodiments of the present disclosure.

For instance, in the embodiment of FIG. 15A, the spatial diversity elements 1 . . . n 1504 associated with a given CBSD/xNB may be communicative with respective ones of the antenna elements 522 of a given radio 601 of the CPE 509 (e.g., elements 1 and 2 respectively of the configuration shown in FIG. 7).

Figure 15B:
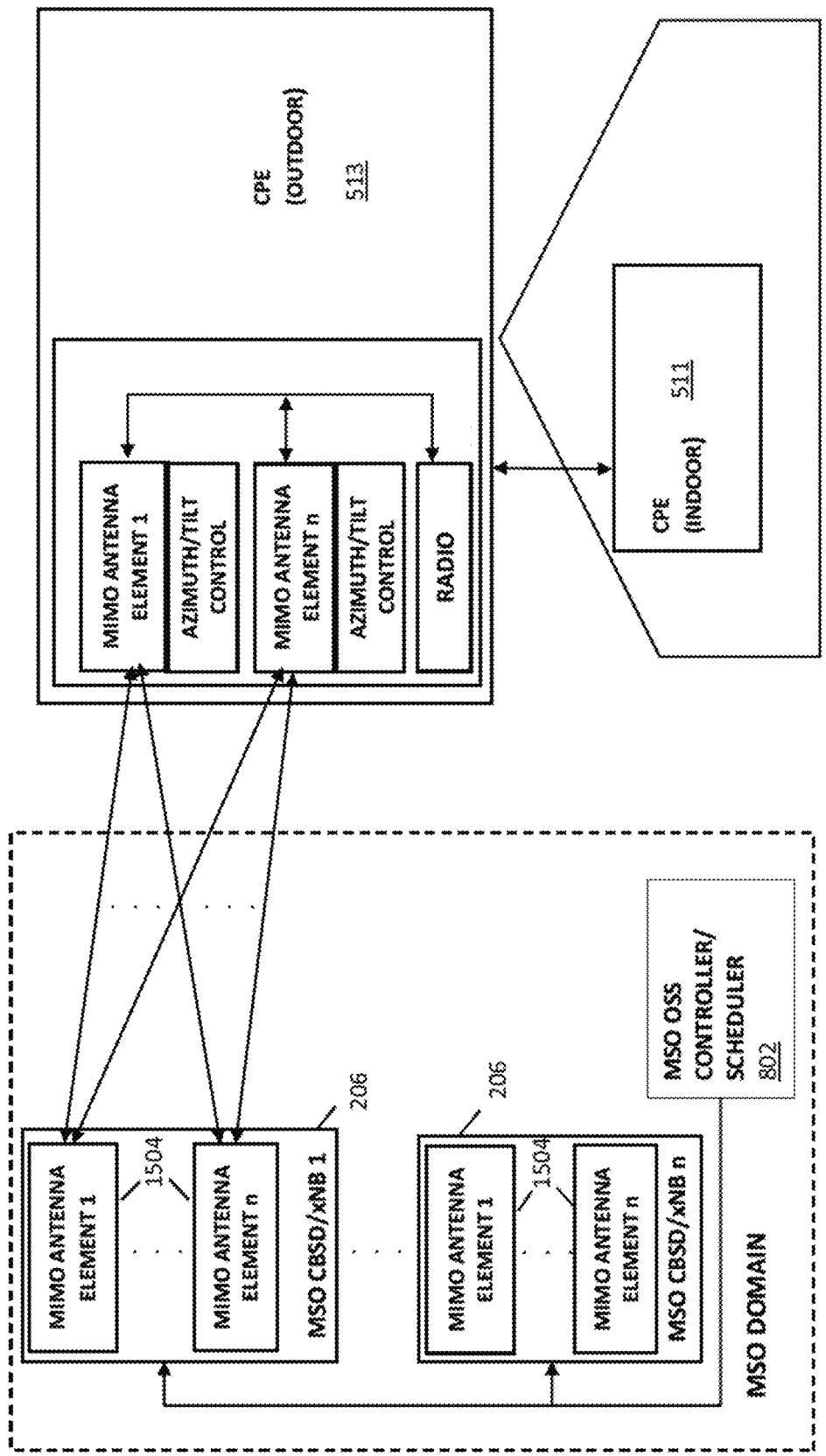

FIG. 15B shows multiple antenna elements 522 of the same radio apparatus 601 communicating with each of multiple corresponding antenna elements of a single CBSD.

Figure 15C:
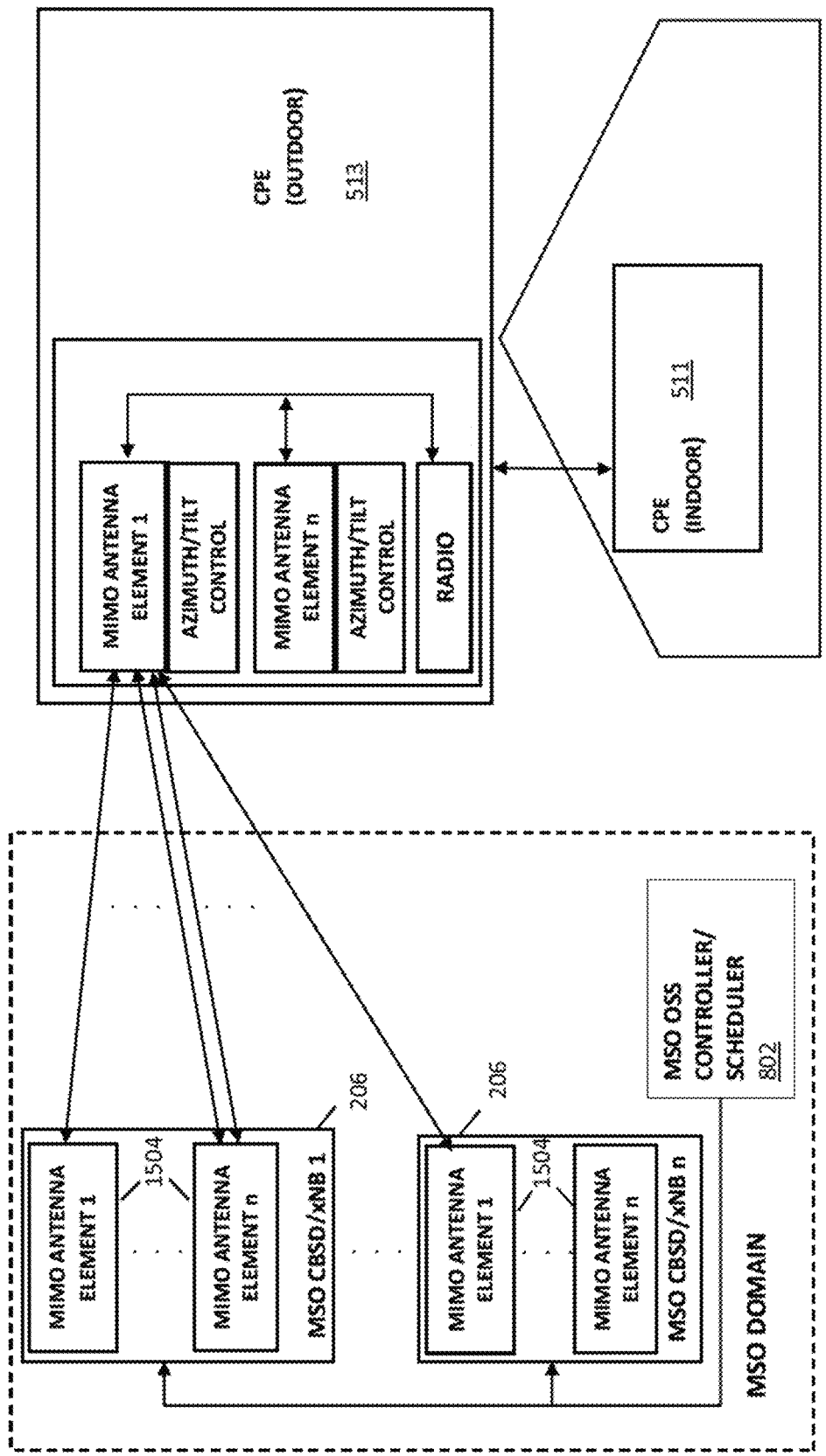

FIG. 15C shows a single antenna element 522 of the same radio apparatus 601 communicating with each of multiple corresponding antenna elements of multiple different CBSDs 206.

Figure 15D:
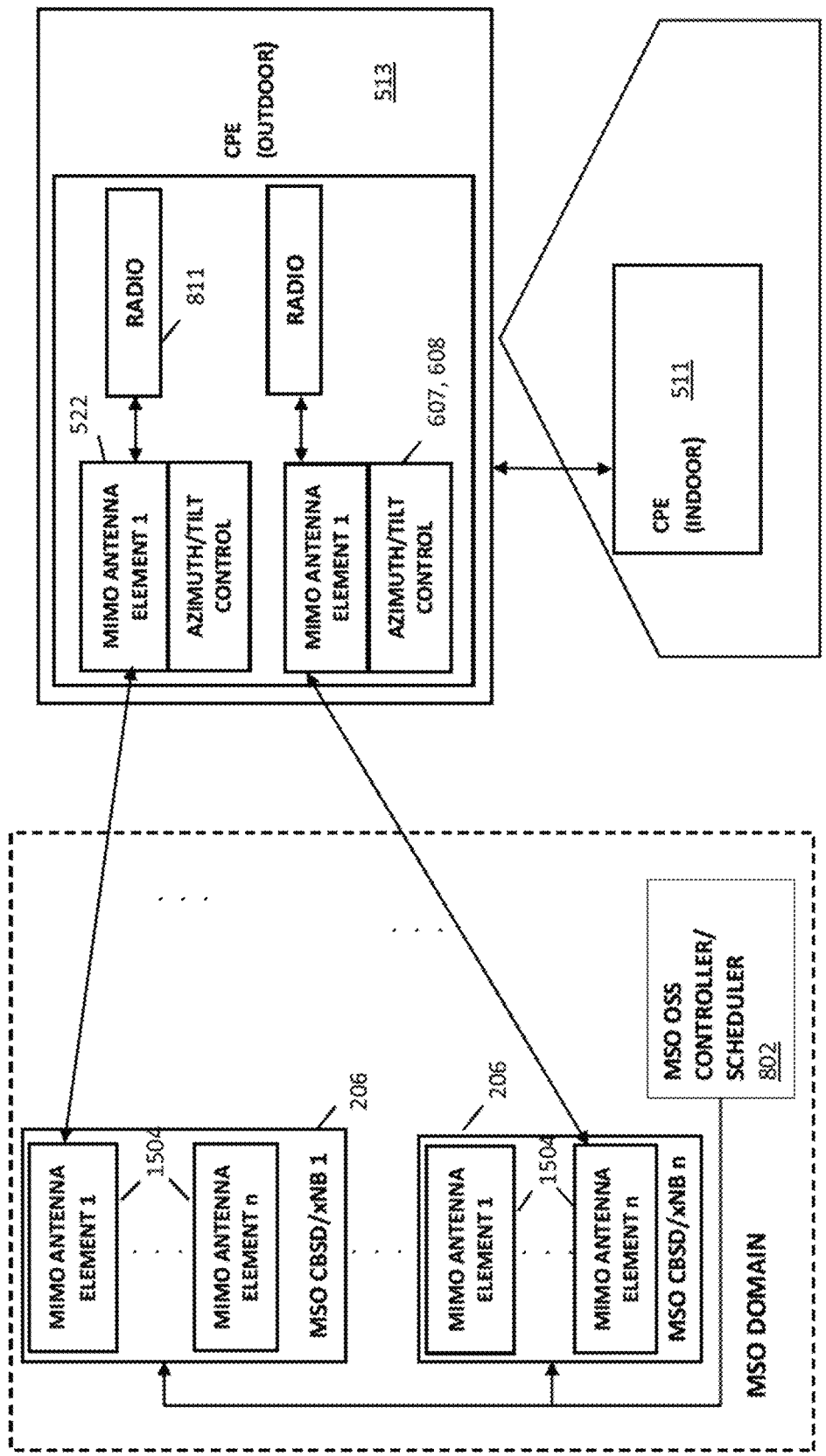

As a further example, FIG. 15D shows a single antenna element 522 of different radio apparatus 601 of the CPE 509 communicating with a corresponding antenna element of respective different CBSDs 206.

Consistent with the use of multiple different radio apparatus and connections (whether with a single CBSD or multiple CBSD), it will further be appreciated that multipath packet processing may be utilized, such as that described in co-pending U.S. patent application Ser. No. 16/738,889 filed Jan. 9, 2020 and entitled "METHODS AND APPARATUS FOR SERVICE PROVISION TO OUT-OF-COVERAGE APPARATUS IN WIRELESS SYSTEMS", as well as U.S. patent application Ser. No. 16/676,188 filed Nov. 6, 2019 and entitled "METHODS AND APPARATUS FOR ENHANCING COVERAGE IN QUASI-LICENSED WIRELESS SYSTEMS," each of the foregoing incorporated herein by reference in its entirety. For example, as described therein, MPTCP or STCP-based protocol stacks and processing may be used to allow for packet aggregation or dis-aggregation at e.g., the transport layer of the CPE 509 (e.g., via an SCTP or MPTCP logic stack operative to execute on the CPE/FWA 509), thereby avoiding typical "head of the line" blocking of a standard protocol such as TCP.

It will also be appreciated that while spatial diversity examples are shown in FIGS. 15A-15D, the present disclosure contemplates use of frequency diversity, as well a spectrum "type" diversity across multiple different radios of the CPE 509. For instance, in one variant, different radios 601 and their associated antenna elements 522 use different carrier frequencies for communication with different CBSDs. In another variant, one radio may use GAA spectrum (unlicensed), while another used for a particularly "contentious" or interference-laden physical propagation path or azimuth uses PAL (which is ostensibly much cleaner due to having at least some licensing-type restrictions on use associated therewith).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for optimizing an antenna configuration of a fixed wireless device operated in a wireless network, the computerized method comprising:
   obtaining channel performance data, the channel performance data relating to at least one wireless channel between the fixed wireless device and at least one base station; and
   utilizing at least a portion of the obtained channel performance data to optimize at least one antenna configuration of the fixed wireless device, the utilizing comprises generating control data for use by at least a controller apparatus of the fixed wireless device, the controller apparatus comprising a closed-loop system;
   wherein:
   the fixed wireless device comprises a CBRS (Citizens Broadband Radio Service) compliant fixed wireless access (FWA) device; and
   radio frequency (RF) signals associated with the at least one channel are transmitted within a frequency range between 3.550 and 3.70 GHz inclusive between the fixed wireless device and the at least one base station, the at least one base station comprising a CBRS compliant CBSD (Citizens Broadband radio Service Device).

2. The computerized method of claim 1, wherein the fixed wireless device comprises a consumer premises device of a subscriber of a managed wireless network, and the generating of the control data for use by the controller apparatus of the fixed wireless device enables the optimization to occur autonomously without service intervention by an operator of the managed wireless network.

3. The method of claim 1, wherein the utilizing comprises iteratively providing at least the portion of the channel performance data to the closed-loop system of the fixed wireless device in order to enable generation of respective iterative command data by the closed loop system.

4. The method of claim 1, wherein the utilizing comprises iteratively providing at least the portion of the channel performance data to a network-based controller process in data communication with the fixed wireless device in order to enable generation of respective iterative command data by the network-based controller process.

5. The method of claim 1, wherein the utilizing at least the portion of the obtained data to optimize the at least one antenna configuration of the fixed wireless device comprises causing adjustment of at least one of antenna element of the fixed wireless device in at least one of azimuth or elevation so as to maximize an antenna gain parameter.

6. The method of claim 5, wherein the at least one of antenna element of the fixed wireless device comprises a directional antenna element having a prescribed transmit or receive beam dispersion associated therewith, and the optimization comprises calculating a prescribed degree of overlap with at least one other adjacent beam.

7. The method of claim 1, wherein the obtained channel performance data includes data relating to one or more key performance indicators (KPIs) selected from the group consisting of latency; error rate; and jitter.

8. The method of claim 1, wherein:
the obtaining of the channel performance data comprises obtaining a plurality of channel performance data each relating at least one wireless channel between respective ones of a plurality of fixed wireless devices and respective ones of base stations; and
the utilizing at least the portion of the obtained channel performance data to optimize at least one antenna configuration of the fixed wireless device comprises utilizing the plurality of channel performance data to generate an adjustment plan for the plurality of fixed wireless devices, the adjustment plan configured to optimize at least one performance parameter for at least a first subset of the plurality of fixed wireless devices.

9. The method of claim 8, further comprising causing adjustment of at least a second subset of the plurality of fixed wireless devices in accordance with the adjustment plan.

10. The computerized method of claim 1, further comprising:
transmitting at least a portion of the generated control data to a network computerized process of the managed wireless network that is in data communication with the controller apparatus; and
receiving second control data from the network computerized process, the second control data useful in optimizing at least one antenna configuration of the fixed wireless device.

11. A computerized premises apparatus for use in a wireless infrastructure, the computerized premises apparatus comprising:
digital processing apparatus;
an antenna system comprising an antenna array having a plurality of antenna elements and at least one actuation apparatus configured to change at least one aspect of the operation of at least one of the plurality of antenna elements;
controller apparatus in data communication with the antenna system and the digital processing apparatus and configured to control the at least one actuation apparatus; and
a storage device in data communication with the digital processing apparatus, the storage device comprising a storage medium having at least one computer program, the at least one computer program configured to, when executed on digital processing apparatus, cause the computerized premises apparatus to:
determine channel performance data based on radio frequency signals transmitted from or received by the antenna system;
cause storage of the determined channel performance data; and
cause analysis of at least a portion of the determined channel performance data to determine a first configuration for the antenna system, the first configuration configured to provide a desired level of performance for at least one communication channel between the computerized premises apparatus and a node in the wireless infrastructure;
wherein the actuation apparatus comprises: (i) an electromechanical tilt actuator configured to change an angle of elevation of the at least one of the plurality of antenna elements; and (ii) an azimuth actuator configured to change an azimuth of at least one of a) the at least one of the plurality of antenna elements individually, or b) the antenna array as a whole.

12. The computerized premises apparatus of claim 11, wherein the computerized premises apparatus comprises a CBRS (Citizen Broadband radio Service)-compliant FWA (fixed wireless access) device that is capable of data communication with the 3GPP (3rd Generation Partnership Project) compliant eNB (eNodeB) or gNB (gNodeB) via at least one CBRS band carrier frequency within a band of 3.55 to 3.70 GHz, the CBRS-compliant FWA device configured to operate at a power level less than or equal to 23 dBm.

13. The computerized apparatus of claim 11, wherein the at least one computer program is further configured to, when executed on the digital processing apparatus, cause the computerized premises apparatus to transmit the determined channel performance data to a network-based computerized process via the at least one communication channel; and
wherein the causation of the analysis of at least the portion of the determined channel performance data to determine a first configuration for the antenna system comprises causation of the network-based computerized process to perform an algorithmic analysis of at least the transmitted channel performance data to enable generation of command data to be used by the controller apparatus after receipt of the command data by the computerized premises apparatus from the network-based computerized process.

14. A computer readable apparatus for use in a fixed wireless apparatus disposed at a user premises, the computer readable apparatus comprising a non-transitory storage medium configured to store one or more computer programs, the one or more computer programs configured to, when executed on a processing apparatus of the fixed wireless apparatus, cause the fixed wireless apparatus to:
cause a controller apparatus of the fixed wireless apparatus to execute a training plan, the training plan causing at least one antenna element of the fixed wireless apparatus to implement an adjustment to at least one of a transmit or receive beam configuration or position;
obtain data relating to at least one wireless channel of the fixed wireless apparatus from a monitoring process operative to execute on the fixed wireless apparatus, the obtained data relating to at least a first time period before and a second time period after the adjustment; and utilize the obtained data to generate output data indicative of at least one of radio frequency (RF) signal strength or wireless data channel performance as a function of the adjustment.

15. The computer readable apparatus of claim 14, wherein the controller apparatus comprises a closed-loop system, and the one or more computer programs are further configured to, when executed on the processing apparatus of the fixed wireless apparatus, cause the fixed wireless apparatus to: utilize at least a portion of the output data to generate feedback data for provision to the controller apparatus during post-provisioning operation of the fixed wireless apparatus, the feedback data configured to enable the controller apparatus to dynamically adjust the at least one antenna element in order to maintain or achieve a desired level of performance for the at least one wireless channel autonomously without service personnel intervention.

16. The computer readable apparatus of claim 14, wherein:
the training plan comprises adjustment of at least one of azimuth or elevation of the at least one antenna element in increments to a plurality of respective different positions over a period of time; and
the obtainment of the data relating to the at least one wireless channel of the fixed wireless apparatus data from the monitoring process operative to execute on the fixed wireless apparatus comprises obtainment of data relating to data rate or throughput for the at least one wireless channel for each of the plurality of respective different positions.

17. The computer readable apparatus of claim 14, wherein:
the training plan comprises adjustment of at least one of azimuth or elevation of the at least one antenna element in increments to a plurality of respective different positions over a period of time; and
the obtainment of the data relating to the at least one wireless channel of the fixed wireless apparatus data from the monitoring process operative to execute on the fixed wireless apparatus comprises obtainment of data relating to radio frequency signal strength within a prescribed frequency band for each of the plurality of respective different positions.

18. The computer readable apparatus of claim 17, wherein the utilization of the obtained data to generate the output data indicative of the at least one of the radio frequency (RF) signal strength or the wireless data channel performance as the function of the adjustment comprises generation of an RF heat map data structure, the RF heat map data structure configured to enable correlation of at least one of azimuth or elevation of the at least one antenna element to a local maximum in RF signal strength for signals emanated from at least one wireless base station within wireless range of the fixed wireless apparatus.

19. A computerized method of optimizing of an antenna configuration of a fixed wireless access (FWA) device after installation of the FWA device at a premises, the computerized method comprising:
obtaining first channel performance data relating to at least one wireless channel between the FWA device and a first base station;
determining that one or more other FWA devices which may impact performance of the at least one wireless channel have been installed subsequent to the obtaining of the first channel performance data;
based at least on the determining, causing obtainment of second channel performance data relating to at least one second wireless channel; and
utilizing at least a portion of the obtained second channel performance data to optimize a configuration of least one antenna of the FWA device at least with respect to the one or more other FWA devices.

20. The computerized method of claim 19, wherein:
the network computerized process comprises at least one of a CU (Controller Unit) or DU (Distributed Unit) of a 5G NR (Fifth Generation New Radio) gNB (g Node B) apparatus configured to utilize at least one of NR-U (New Radio-Unlicensed) or CBRS (Citizens Broadband Radio Service) radio frequency spectrum; and
the transmitting comprises transmitting the at least portion of the generated control data using the at least one radio frequency spectrum.

21. The computerized method of claim 19, wherein:
the steps of obtaining, determining, causing and utilizing are each performed by the FWA device; and
the computerized method further comprises receiving data generated by a network computerized process and relating to the optimization via a wireless channel so that the FWA device can configure the antenna configuration based thereon.

22. The computerized method of claim 21, wherein the determining that the one or more other FWA devices which may impact the performance of the at least one wireless channel have been installed subsequent to the obtaining of the channel performance data comprises obtaining data from the network computerized process in data communication with a service provider database, the obtained data comprising data on FWA device installations within one or more geographic areas.

23. The computerized method of claim 19, wherein:
the steps of obtaining, determining, causing and utilizing are each performed by a network computerized process in data communication with the FWA device; and
the computerized method further comprises causing transmitting of data generated by the network computerized process and relating to the optimizing to the FWA device over a wireless channel so that the FWA device can configure the antenna configuration based thereon.

24. The computerized method of claim 19, wherein the utilizing at least the portion of the obtained second channel performance data to optimize the configuration of the at least one antenna comprises utilizing the at least portion of the obtained second channel performance data to reduce a beam dispersion associated with the at least one antenna in order to reduce overlap with the one or more other FWA devices.

25. The method of claim 24, further comprising utilizing at least the portion of the obtained second channel performance data to determine at least a transmit power reduction for at least one of (i) the FWA device, or (ii) the one or more other FWA devices.

26. The computerized method of claim 19, wherein:
the optimizing of the antenna configuration of the FWA device comprises optimizing an antenna configuration of a CBRS (Citizens Broadband Radio Service) compliant FWA device; and
radio frequency (RF) signals associated with the at least one wireless channel are transmitted within a frequency range between 3.550 and 3.70 GHz inclusive between the FWA device and the first base station, the first base station comprising a CBRS compliant CBSD (Citizens Broadband Radio Service Device).

\* \* \* \* \*